United States Patent
Moriyama et al.

(10) Patent No.: US 8,110,950 B2
(45) Date of Patent: Feb. 7, 2012

(54) CORELESS LINEAR MOTOR HAVING A NON-MAGNETIC REINFORCING MEMBER

(75) Inventors: Tsuyoshi Moriyama, Kanagawa (JP); Ikuma Naruyoshi, Kanagawa (JP); Tomoyuki Hoshikawa, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 534 days.

(21) Appl. No.: 10/582,552

(22) PCT Filed: Dec. 9, 2004

(86) PCT No.: PCT/JP2004/018393
§ 371 (c)(1),
(2), (4) Date: Jul. 25, 2007

(87) PCT Pub. No.: WO2005/057763
PCT Pub. Date: Jun. 23, 2005

(65) Prior Publication Data
US 2008/0048505 A1 Feb. 28, 2008

(30) Foreign Application Priority Data

Dec. 9, 2003 (JP) .................................. 2003-410867
Dec. 9, 2003 (JP) .................................. 2003-410870

(51) Int. Cl.
*H02K 41/02* (2006.01)
*H02K 33/00* (2006.01)
*H02K 35/00* (2006.01)

(52) U.S. Cl. ............... 310/12.31; 310/12.22; 310/12.21; 310/12.24; 310/12.25

(58) Field of Classification Search ............... 310/12.22, 310/12.25, 12.29, 12.31; H02K 41/02
See application file for complete search history.

(56) References Cited

U.S. PATENT DOCUMENTS

| | | | | |
|---|---|---|---|---|
| 4,445,798 A | * | 5/1984 | Munehiro | 310/12.04 |
| 5,057,723 A | * | 10/1991 | Umehara et al. | 310/12.04 |
| 5,783,877 A | * | 7/1998 | Chitayat | 310/12.33 |
| 6,075,297 A | * | 6/2000 | Izawa et al. | 310/12.21 |
| 6,300,691 B1 | * | 10/2001 | Hwang et al. | 310/12.29 |

(Continued)

FOREIGN PATENT DOCUMENTS

JP 1-127379 8/1989
(Continued)

OTHER PUBLICATIONS

Office Action issued in JP Appl. 2003-410870 on Apr. 27, 2010.
(Continued)

*Primary Examiner* — Quyen Leung
*Assistant Examiner* — Michael Andrews
(74) *Attorney, Agent, or Firm* — DLA Piper LLP US

(57) ABSTRACT

A coreless linear motor having a high rigidity, a high heat radiation effect, and a light weight is provided. The coreless linear motor includes a fixed member and a movable member moving relative with respect to the fixed member. The fixed member has a yoke and groups of permanent magnets arranged in the yoke. The movable member has a coil assembly. The groups of permanent magnets include first and second groups of permanent magnets arranged so as to face each other. Each of the first and second groups of permanent magnets has a plurality of magnets along a longitudinal direction of the yoke. In the plurality of magnets, magnetic poles of magnets facing along the longitudinal direction of the yoke alternate. Magnetic poles of the permanent magnets along the longitudinal direction of the yoke are the same. The coil assembly has at least three coils arranged movably relative to the first and second groups of permanent magnets along the longitudinal directions of the yoke between the first and second groups of permanent magnets, coils are arranged and wound in multiple layers in a solid state and fastened by a binder, and end surfaces of adjacent coils are connected via electrical insulation members. Preferably, a reinforcing member is provided as a non-magnetic member fit in the solid portions of the coils.

12 Claims, 32 Drawing Sheets

U.S. PATENT DOCUMENTS

| | | | |
|---|---|---|---|
| 6,528,905 B1 * | 3/2003 | Hwang et al. | 310/12.29 |
| 6,864,602 B2 * | 3/2005 | Korenaga | 310/12.24 |
| 6,956,308 B2 * | 10/2005 | Binnard | 310/52 |
| 2003/0173836 A1 * | 9/2003 | Inagaki et al. | 310/14 |

FOREIGN PATENT DOCUMENTS

| | | |
|---|---|---|
| JP | 9-182410 | 7/1997 |
| JP | 2000-78827 | 3/2000 |
| JP | 2000-180570 | 6/2000 |
| JP | 2000-278932 | 10/2000 |
| JP | 2002-238240 | 8/2002 |

OTHER PUBLICATIONS

English Language Translation of Office Action issued in JP Appl. 2003-410870 on Apr. 27, 2010.

* cited by examiner

CORELESS LINEAR MOTOR HAVING A NON-MAGNETIC REINFORCING MEMBER

TECHNICAL FIELD

The present invention relates to a coreless linear motor.

BACKGROUND ART

A coreless linear motor is a linear motor of a type in which a coil is not wound around the core, that is, an armature does not have a core. Such a coreless linear motor has advantages that there is no cogging, a thrust fluctuation is small, precise control is easy, and so on.

Coreless linear motors are used in various fields, for example, machine tools, injection molding machines, and semiconductor production apparatuses.

In the coreless linear motor disclosed in Patent Document 1, Japanese Patent Publication (A) No. 2002-165434, a holding plate to which a coil is fixed is arranged between a pair of rows of permanent magnets arranged in straight lines. The interaction of the magnetic flux heading from one row of permanent magnets to the other row of permanent magnets and current flowing in the coil generates thrust based on Fleming's left-hand rule. The movable member of this coreless linear motor has a low rigidity since the coil does not have a core. In order to raise the low rigidity, stainless steel, FRP (fiber reinforced plastic, registered trademark of DuPont Corporation), or another non-magnetic material having a high rigidity is formed flat on the two surfaces of the holding plate and the coil is fixed to this by a resin in order to secure the rigidity of the movable member. However, in the coreless linear motor having the above structure, the holding plate of the coil is present in the path of the magnetic flux of the magnetic circuit, therefore the holding plate cannot be made thick. Namely, in the coreless linear motor of the type fixing the coil to the two surfaces of the holding plate, the greater the thickness of the holding plate, the lower the efficiency of utilization of the magnetic flux generated by the permanent magnets, therefore the holding plate cannot be made thick and there is a limit to improvement of the rigidity of the movable member in its structure. In this way, when a sufficient rigidity cannot be secured in the holding plate, there is the disadvantage that vibration is easily generated when the coreless linear motor is driven and the control loop gain cannot be raised.

In the coreless linear motor explained above, the coil constituting the armature is fixed to the holding plate by a resin having a low heat conductivity and the holding plate is formed by stainless steel or another material having a low heat conductivity, therefore the temperature inside the coreless linear motor easily rises due to the heat generated from the coil. As a result, positional deviation of components of the coreless linear motor occurs due to a temperature change. As a result, it is difficult to secure positioning precision of the coreless linear motor. From the viewpoint of heat radiation, preferably aluminum alloy or another metal having a high heat conductivity is used for the holding plate, but a metal having a high heat conductivity also has a low electrical resistance in comparison with stainless steel etc., therefore, when driving the linear motor, a considerably larger induction current than that in the case of use of stainless steel is generated. A force in a reverse direction to the thrust is generated due to the interaction of this induction current and the magnetic flux of the magnets and the fluctuation of the thrust with respect to the movable member in the linear motor becomes large. From the above viewpoint, aluminum alloy or another metal having a high heat conductivity is not suitable for use for the holding plate.

Patent Document 1: Japanese Patent Publication (A) No. 2002-165434

DISCLOSURE OF THE INVENTION

An object of the present invention is to provide a coreless linear motor improving the rigidity of the armature and able to suppress a temperature rise due to heat generation of an armature coil.

Another object of the present invention is to lighten the weight of the above coreless linear motor.

The coreless linear motor of the present invention is comprised a fixed member and a movable member moving relatively with respect to the fixed member.

In a coreless linear motor of a first aspect of the present invention, the fixed member has a yoke and groups of permanent magnets fixed to the yoke, and the movable member has a coil assembly. The movable member having a coil assembly moves between the groups of permanent magnets.

In a coreless linear motor of a second aspect of the present invention, the movable member has a yoke and groups of permanent magnets arranged in the yoke. The fixed member has a coil assembly. The groups of permanent magnets and the movable member having the yoke move along a longitudinal direction of the coil assembly.

The yoke has first and second facing yoke parts facing each other across a first distance and formed by magnetic materials and a connection yoke part connecting first ends of the first and second facing yoke parts.

The groups of permanent magnets include first and second groups of permanent magnets arranged so as to face the facing surfaces of the first and second facing yoke parts. Each of the first and second groups of permanent magnets has a plurality of magnets along the longitudinal direction of the yoke. In the plurality of magnets of each of the first and second groups of permanent magnets, the magnetic poles of magnets facing each other along the longitudinal direction of the yoke are different from each other, and the magnetic poles of the permanent magnets along the longitudinal direction of the yoke are the same.

The coil assembly has at least three coils arranged movably relative to the first and second groups of permanent magnets along the longitudinal direction of the yoke between the first and second groups of permanent magnets. At least three coils are arranged and wound solidly in multiple layers, then fastened by a binder. The end surfaces of adjacent coils are connected with each other via an electrical insulation member.

Preferably, it is further included a non-magnetic reinforcing member inserted into the solid portion of the coil. More preferably, a hole through which a cooling agent passes is formed inside the reinforcing member.

More preferably, the reinforcing member is arranged spaced from the surfaces of the first and second groups of permanent magnets by exactly the distance whereby the density of the magnetic flux incident upon the surface of the reinforcing member becomes ½ or less of the magnetic flux density of the magnets at the center of the surfaces of the facing first and second groups of permanent magnets.

The objects and features of the present invention explained above and other objects and features will become clearer from the following description given with reference to the accompanying drawings

Figure 1:
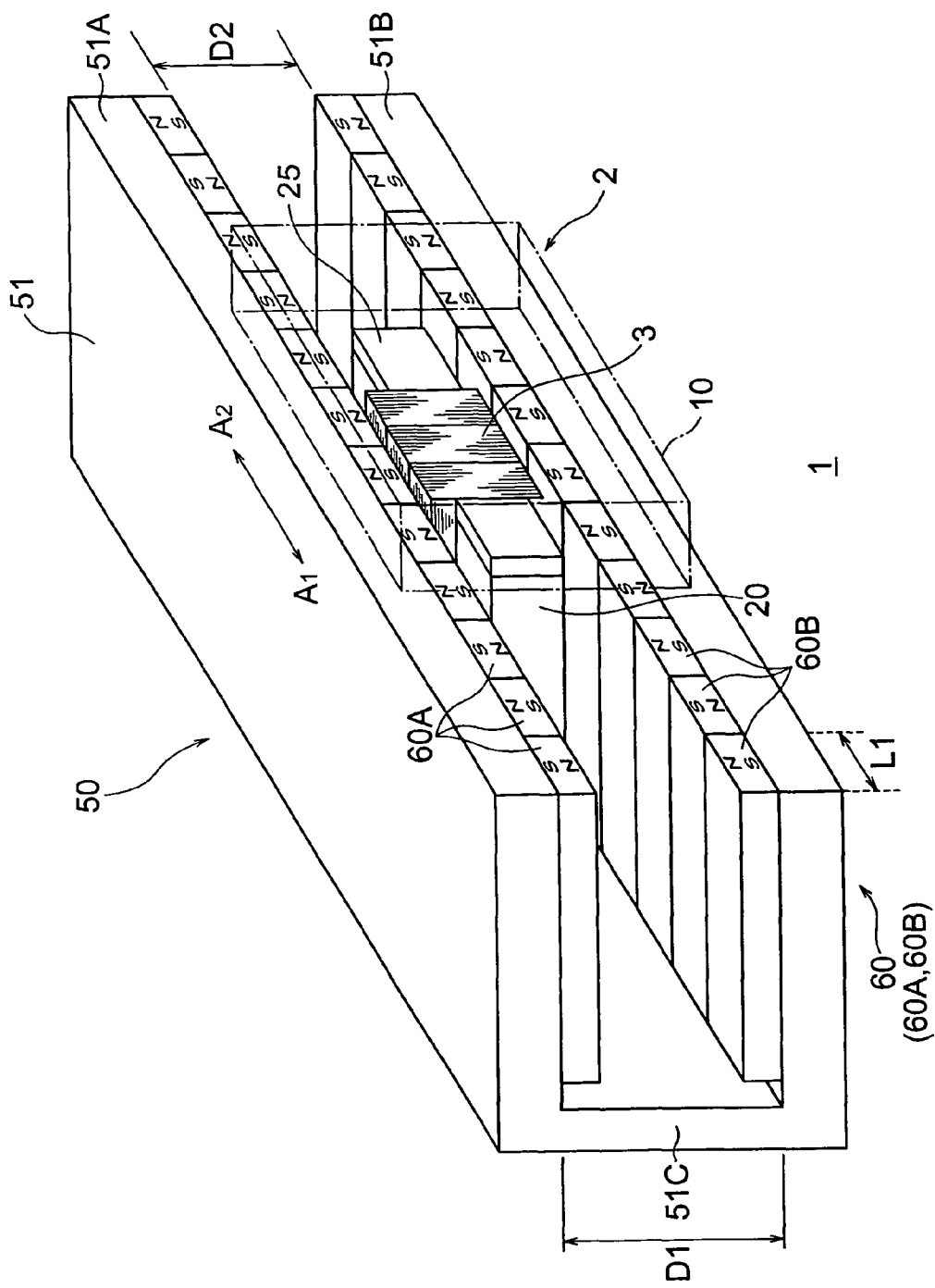
FIG. 1 is a perspective view showing the structure of a coreless linear motor of a first embodiment based on the present invention.

DESCRIPTION OF NOTATIONS 1, 100 . . . coreless linear motor
2, 150 . . . movable member
3, 30, 103 . . . coil assembly
3A, 3B, 3C . . . 3-phase coil
5, 50, 101 . . . fixed member
9, 109 . . . electrical insulation member
10, 110 . . . holding member
11 . . . fastening member
20, 120 . . . reinforcing member
25, 125 . . . spacer
51, 151 . . . yoke
51A, 51B . . . first, second facing yoke parts
51C . . . connection yoke part
60 . . . groups of permanent magnets
60A to 60D . . . group of permanent magnets

BEST MODE FOR CARRYING OUT OF THE INVENTION

Preferred embodiments of the coreless linear motor of the present invention will be explained with reference to the attached drawings.

First Embodiment

A coreless linear motor 1 of a first embodiment based on the present invention will be explained with reference to FIG. 1 to FIG. 5.

FIG. 1 is a perspective view showing a structure of a coreless linear motor of the first embodiment based on the present invention.

The coreless linear motor 1 has a fixed member 50 and a movable member 2 moving relative to the fixed member 50.

The fixed member 50 functions as a stator, while the movable member 2 functions as an armature.

The fixed member 50 has a yoke 51, a first group of permanent magnets 60A, and a second group of permanent magnets 60B. The first and second groups of permanent magnets 60A and 60B will be referred to all together as the groups of permanent magnets 60.

The yoke 51 is constituted by first and second facing yoke parts 51A and 51B having inner faces facing each other and face each other with a first distance D1 therebetween and a connection yoke part 51C arranged perpendicular to these yoke parts 51A and 51B and connecting first ends of the yoke parts 51A and 51B along the direct-acting directions (or longitudinal direction of yoke 51) A1 and A2. The other ends of the first and second facing yoke parts 51A and 51B are not connected, but are open in state.

Outside surfaces of the first and second facing yoke parts 51A and 51B and/or connection yoke part 51C are fixed to a not illustrated base etc.

The direct-acting directions (or longitudinal direction of the yoke 51) A1 and A2 are directions in which the movable member 2 reciprocally moves between the first and second groups of permanent magnets 60A and 60B.

The first and second facing yoke parts 51A and 51B and the connection yoke part 51C are preferably integrally formed by iron or another ferro-magnetic material. The first and second facing yoke parts 51A and 51B and the connection yoke part 51C may be formed as different members and integrally joined. When forming these as different members in this way, a configuration may be employed of using ferro-magnetic members for the first and second facing yoke parts 51A and 51B and using a non-magnetic member for the connection yoke part 51C. From the viewpoint of reduction of weight of the coreless linear motor 1, material of a connection yoke part 51C may be need an aluminum alloy or other high specific strength, light weight metal, a reinforced plastic, or other non-magnetic material.

The first and second groups of permanent magnets 60A and 60B are arranged (fixed) facing the facing surfaces of the first and second facing yoke parts 51A and 51B across a second distance D2.

The first group of permanent magnets 60A arranged at the first facing yoke part 51A has a plurality of permanent magnets having the same width along the direct-acting directions A1 and A2. These plurality of permanent magnets are arranged toward the facing second group of permanent magnets 60B along the direct-acting directions (or longitudinal direction of the yoke 51) A1 and A2 so that magnetic poles are alternately reversed, that is, the N pole magnets and the S pole magnets are alternately arranged. In the second group of permanent magnets 60B arranged in the second facing yoke part 51B, in the same way as the first group of permanent magnets 60A, a plurality of permanent magnets having the same width are arranged along the direct-acting directions A1 and A2 so that the N poles and the S poles are alternately arranged. In the direct-acting directions A1 and A2, the magnetic poles of the facing permanent magnets in the first and second groups of permanent magnets 60A and 60B are the same, and the length of each permanent magnet is L1.

Figure 2:
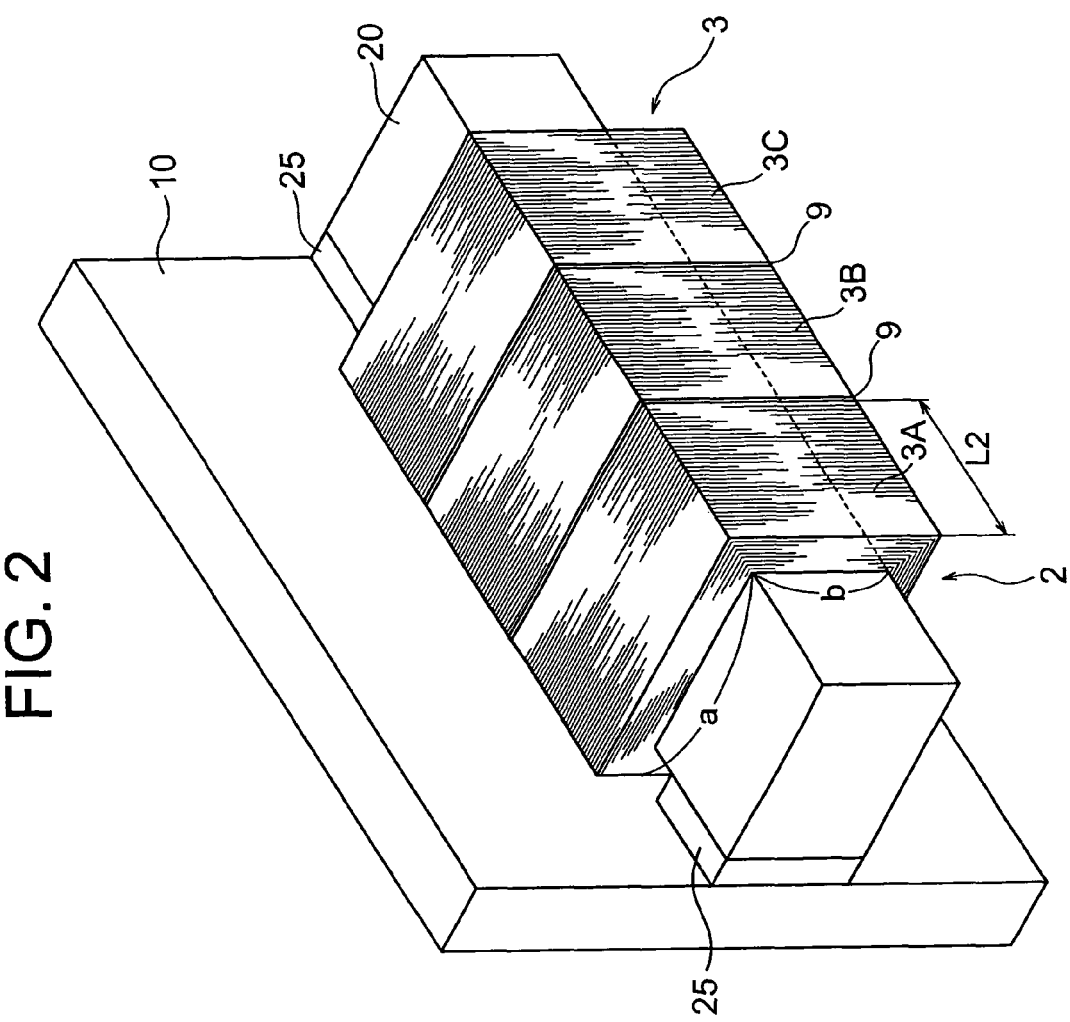
FIG. 2 is a perspective view showing the structure of a movable member in the coreless linear motor illustrated in FIG. 1.
Figure 3:
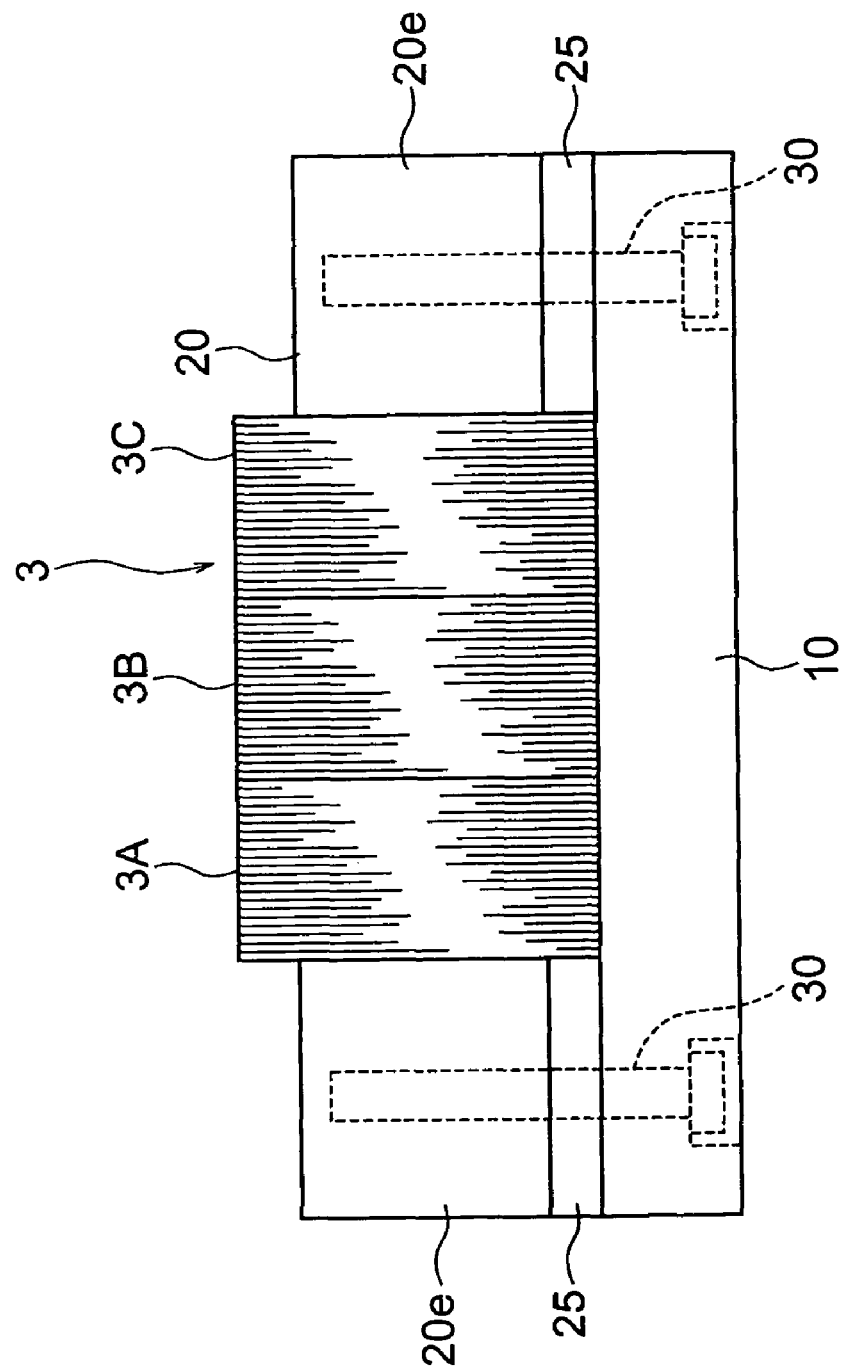
FIG. 3 is a side view of the movable member illustrated in FIG. 2.

FIG. 2 and FIG. 3 are perspective views showing the structure of the movable member 2.

The movable member 2 preferably has a coil assembly 3, a reinforcing member 20, a holding member 10, and spacers 25.

Figure 4:
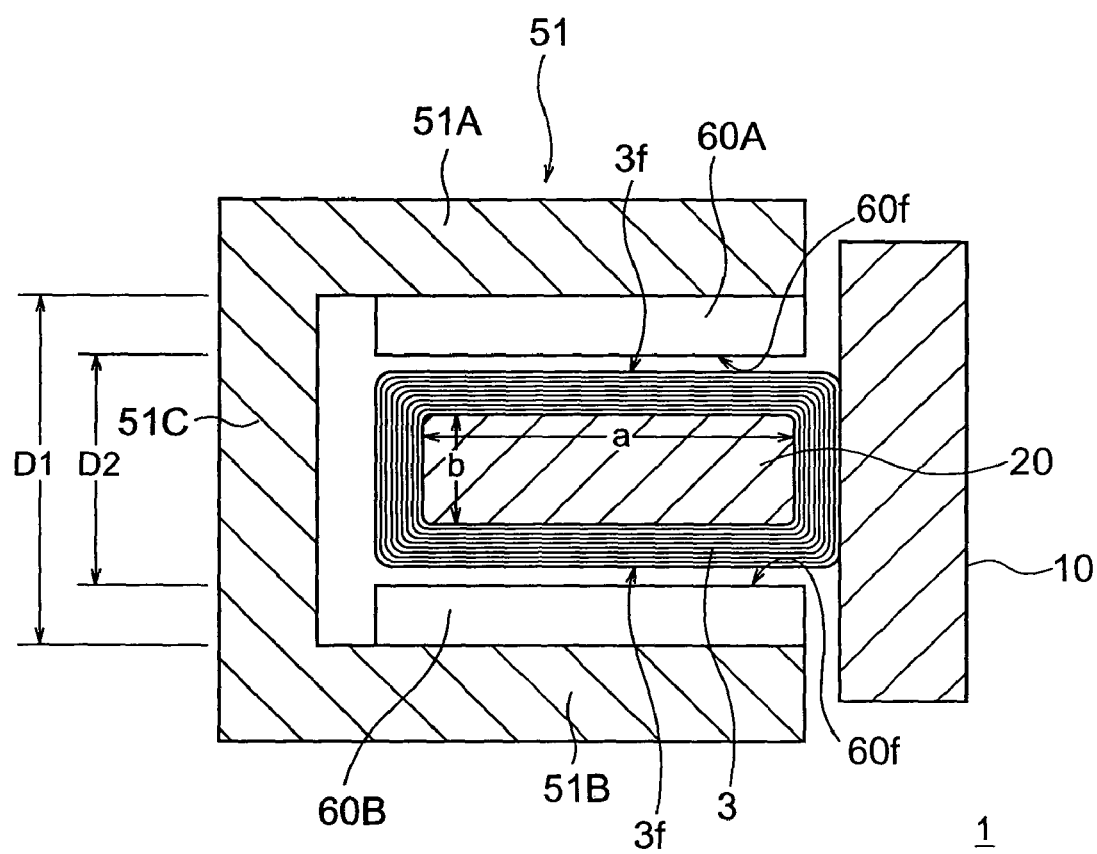
FIG. 4 is a sectional view along a plane perpendicular to the direct-acting directions of the movable member and a fixed member in the coreless linear motor illustrated in FIG. 1.

As illustrated in FIG. 4, the coil assembly 3 and the reinforcing member 20 are guided in the second distance D2 between the first and second groups of permanent magnets 60A and 60B along the direct-acting directions A1 and A2 by a not illustrated guide mechanism fixed to the holding member 10.

The holding member 10 is located at a position illustrated in FIG. 4, but in FIG. 1, the illustration of the holding member 10 is omitted for the simplification of illustration.

The holding member 10 is comprised of a plate like member functioning to hold the coil assembly 3, for example, is formed by stainless steel, aluminum alloy, or another non-magnetic metal.

The coil assembly 3 functioning as the armature of the coreless linear motor 1 is constituted by first to third coils 3A, 3B, and 3C to which AC currents shifted in phase by 120 degrees are applied. The coils 3A, 3B, and 3C have rectangular cross-sections and form a hollow cylindrical shape as illustrated in FIG. 2 and FIG. 4.

A length a of a first portion of the surface of each of the coils 3A, 3B, and 3C facing the first and second groups of permanent magnets 60A and 60B is longer than a length b of a second portion perpendicular to the first portion. The reason for making the length a of the first portion longer is to increase the number of crossings of magnetic fluxes of the first and second groups of permanent magnets 60A and 60B. How the length a of the first portion and the length b of the second portion is determined by considering also what to make the vertical and lateral lengths of the reinforcing member 20 in order to make the rigidity of the reinforcing member 20 a predetermined value. This is because, for example, if making the reinforcing member 20 too flat and thin, the rigidity of the reinforcing member 20 can no longer be maintained.

The 3-phase coils 3A, 3B, and 3C are not wound around the core. Accordingly, this coreless linear motor 1 is a coreless linear motor. The winding directions of the coils 3A, 3B, and 3C are all the same.

The coils 3A, 3B, and 3C are obtained by coating a wet binder on conductive wires covered by for example an electrical insulation material 9, arranging and winding these in multiple layers in a hollow cylindrical state so as to surround the reinforcing member 20, and curing and hardening the binder. After separately forming the rectangular cross-section, hollow cylinder shaped coils 3A, 3B, and 3C, the end surfaces of the adjacent coils 3A, 3B, and 3C are connected with each other by the non-magnetic electrical insulation material 9. The electrical insulation material 9 is for example a glass epoxy resin or a hard alumite-treated aluminum alloy.

By giving the above configuration to the coils 3A, 3B, and 3C, even in a case where the reinforcing member 20 is not provided, a large secondary moment in the cross-section can be obtained and the rigidity of the coil, particularly the bending rigidity and shearing rigidity, rises.

If providing the reinforcing member 20, the rigidity of the coil assembly 3 is further improved. Namely, the reinforcing member 20 is provided in order to impart the required rigidity to the coil assembly 3. The reinforcing member 20 is made a columnar member having a rectangular cross-section as illustrated in FIG. 2 and FIG. 4. The outer shape (contour) dimensions coincide with the dimensions of the inner walls of the hollow portions of the coils 3A, 3B, and 3C. The member is fit in the hollow portions (inner walls) of the hollow cylindrical coils 3A, 3B, and 3C and supports the coils 3A, 3B, and 3C.

The reinforcing member 20 is not positioned in the magnetic field between the first and second groups of permanent magnets 60A and 60B and the coil assembly 3, therefore does not reduce the magnetic field between the first and second groups of permanent magnets 60A and 60B and the coil assembly 3 and does not distorts the magnetic field profile.

After the reinforcing member 20 is fit in the hollow portion of the coil assembly 3 (coils 3A, 3B, and 3C), the reinforcing member 20 and the coil assembly 3 are fixed by an electrical insulation material the same as the electrical insulation material 9 used for the connection of the adjacent coils 3A, 3B, and 3C. In this way, the coil assembly 3 can be previously formed with a predetermined precision, therefore assembly of the reinforcing member 20 and the coil assembly 3 is very easy.

The reinforcing member 20 is formed by a non-magnetic electrically conductive material. As the non-magnetic electrically conductive material used for the reinforcing member 20, for example stainless steel, carbon graphite, an aluminum alloy, or a copper alloy can be used.

The reinforcing member 20 has, other than the function of raising the rigidity of the coil assembly 3, the function of radiating the heat generated in the coils 3A, 3B, and 3C to the outside of the coil assembly 3 with a high efficiency. From that viewpoint, preferably a material having as high a heat conductivity as possible is used as the reinforcing member 20. A metal such as aluminum alloy or a copper alloy is optimum as the material of the reinforcing member 20.

In this way, the reinforcing member 20 has, other than the function of improving the rigidity of the coil assembly 3, a heat radiation function for radiating the heat in the coil assembly 3.

The movable member 2 is desirably reduced in weight. From this viewpoint as well, it is desired to reduce the weight of the reinforcing member 20. As the reinforcing member 20, a non-magnetic, high heat conductive, and light weight material, for example, an aluminum alloy, is preferred.

As shown in FIG. 3, the reinforcing member 20 is longer than the total length in the longitudinal direction of the coil assembly 3 in the direct-acting directions A1 and A2. Ends 20e of the reinforcing member 20 are projected from the two ends of the coil assembly 3. The two ends 20e of the reinforcing member 20 are fixed to the holding member 10 via the spacers 25 by holding means, for example, bolts 30. When fixing the reinforcing member 20 to the holding member 10 via the spacers 25, the holding member 10 holds the facing outer circumferential surfaces of the coil assembly 3 over their entire surfaces.

By imparting such a structure to the coreless linear motor 1, the heat generated in the coils 3A, 3B, and 3C is propagated to the reinforcing member 20 and can be conducted to the holding member 10 via the spacers 25 on the two sides of the coils 3A, 3B, and 3C.

In this way, the spacers 25 have, other than the function of fixing the reinforcing member 20 holding the coil assembly 3 to the holding member 10, the function of propagating the heat of the coils 3A, 3B, and 3C to the holding member 10. The spacers 25 are desirably made of a material which is non-magnetic in the same way as the reinforcing member 20 and has a high heat conductivity other than the mechanical strength for fixing the reinforcing member 20 to the holding member 10. Further, a material having a light weight and a high mechanical structure is preferred. As the material of the spacers 25, for example, an aluminum alloy or other material is desirably used.

By the reinforcing member 20 and the spacers 25, the heat generated in the coils 3A, 3B, and 3C can be conducted to the holding member 10. Further, it becomes possible to radiate the heat generated in the coils 3A, 3B, and 3C to the outside of the linear motor 1 from the holding member 10 with a high efficiency.

As illustrated in FIG. 4, the first distance D1 between the first and second facing yoke parts 51A and 51B and the second distance D2 between the first and second groups of permanent magnets 60A and 60B are made large enough to satisfy the following conditions.

(1) The coil assembly 3 and the reinforcing member 20 can move between the first and second groups of permanent magnets 60A and 60B facing each other across the second distance D2 therebetween which are arranged on facing surfaces of the first and second facing yoke parts 51A and 51B.

(2) Dimensions of the reinforcing member 20 having a thickness enough to secure the rigidity are secured.

(3) The size is made an extent preventing any influence of the magnetic fluxes from the first and second groups of permanent magnets 60A and 60B located at positions facing the first and second facing yoke parts 51A and 51B.

Facing surfaces 60f of the facing first and second groups of permanent magnets 60A and 60B face the outer circumferential surfaces 3f of the coil assembly 3 across a predetermined distance. The facing surfaces 60f and outer circumferential surfaces 3f of the coils 3A, 3B, and 3C are substantially parallel. The distance between the facing surfaces 60f of the first and second groups of permanent magnets 60A and 60B and the inner surface of the coil assembly 3 is set to Ld.

The spacer 25 is not illustrated in FIG. 4.

Figure 5:
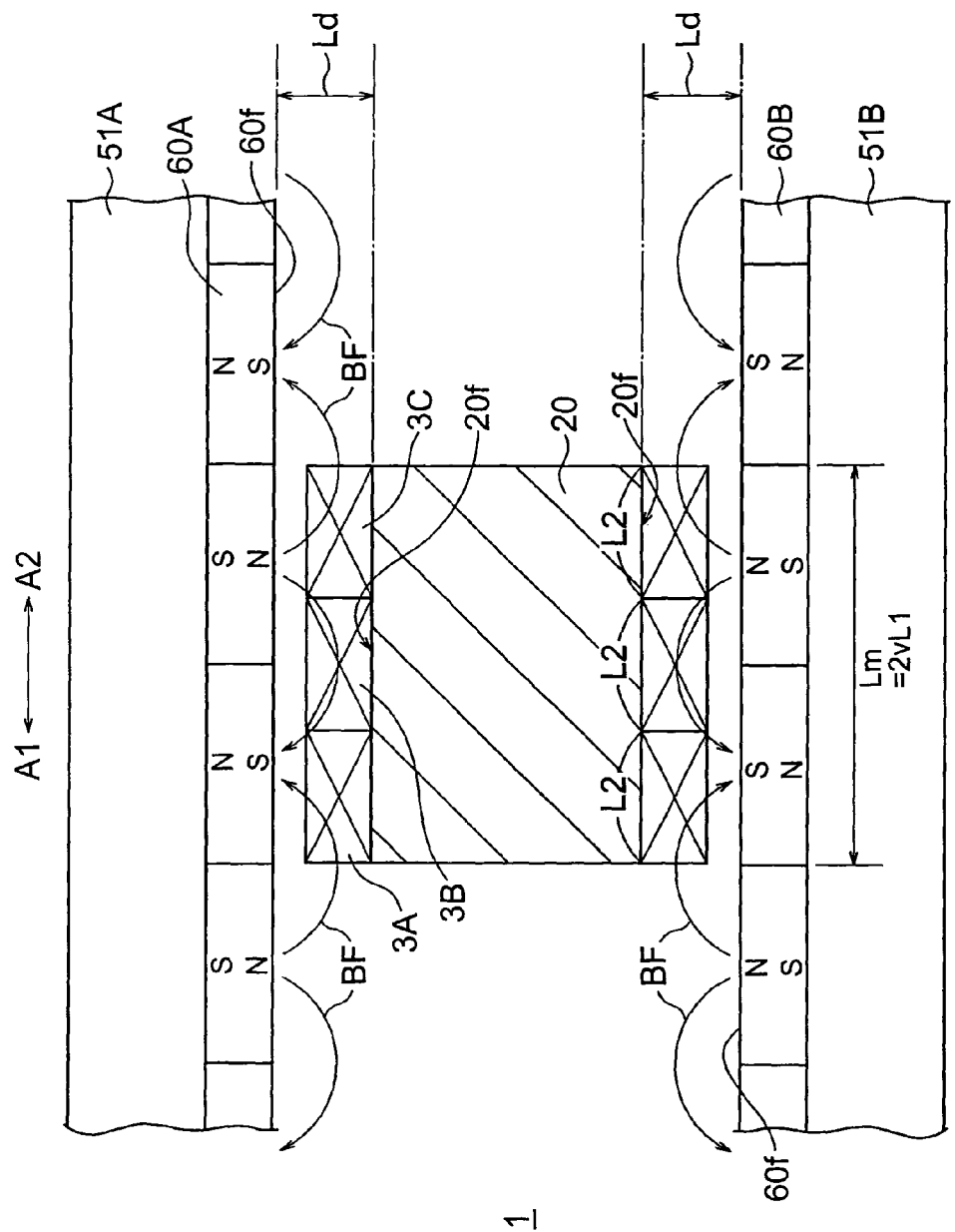
FIG. 5 is a diagram for explaining an operation of the coreless linear motor illustrated in FIG. 1.

As illustrated in FIG. 5, the lengths (widths) L2 of the coils 3A, 3B, and 3C are equal. The lengths Lm=(2×L1) of the adjacent pair of (two) permanent magnets N and S adjacent in the direct-acting directions A1 and A2 of the first and second groups of permanent magnets 60A and 60B and the dimensions Lc=(3×L2) of the three coils 3A, 3B, and 3C substantially coincide. The widths L2 of the coils 3A, 3B, and 3C are shorter than the width L1 of each permanent magnet.

The operation of the coreless linear motor 1 will be explained with reference to FIG. 5.

No magnetic flux BF from the facing first and second groups of permanent magnets 60A and 60B heads from one of the first and second groups of permanent magnets 60A and 60B toward the other since the polarities of the magnetic poles of the facing permanent magnets are the same, but mainly heads toward the adjacent permanent magnets N and S. This magnetic flux becomes a force moving the movable member 2 along the direct-acting directions A1 and A2.

The magnetic fluxes BF of the first and second groups of permanent magnets 60A and 60B are mainly distributed near their surfaces 60f and do not easily reach the reinforcing member 20 inside the coils 3A, 3B, and 3C.

When 3-phase AC currents of the U-phase, V-phase, and W-phase shifted in phase by 120 degrees are applied to the 3-phase coils 3A, 3B, and 3C, the orientation of the currents flowing in the coils 3A, 3B, and 3C on the first facing yoke part 51A side and the orientation of currents flowing in the coils 3A, 3B, and 3C on the second facing yoke part 51B side are reverse and the orientation of the magnetic flux BF passing through the coils 3A, 3B, and 3C on the first facing yoke part 51A side and the orientation of the magnetic flux BF passing through the coils 3A, 3B, and 3C on the second facing yoke part 51B side become reverse. As a result, on the first facing yoke part 51A side and the second facing yoke part 51B side, thrusts having the same orientation with respect to the movable portion 2 (coils 3A, 3B, and 3C) are generated.

When 3-phase AC currents of the U-phase, V-phase, and W-phase shifted in phase by 120 degrees are applied to the 3-phase coils 3A, 3B, and 3C, magnetic fields shifted in phase by 120 degrees are generated due to the electromagnetic induction and an induction current flows in the reinforcing member 20. For example, when the reinforcing member 20 is produced by an aluminum alloy or other metal having a low electric resistance, a large induction current flows in the reinforcing member 20. At this time, if the magnetic flux density of the magnetic fields of the first and second groups of permanent magnets 60A and 60B reaching the inside of the coils 3A, 3B, and 3C is high, a force in the reverse direction to the thrust for moving the movable member 2 is generated. In order to prevent the generation of force in the reverse direction to the thrust in this way, it is necessary to secure exactly the magnitude of the distance (third distance) Ld between the surfaces 60f of the first and second groups of permanent magnets 60A and 60B and the surfaces 20f of the reinforcing member 20 facing these.

When using an aluminum alloy for the reinforcing member 20, it is seen that, if the distance Ld is set so that the density of the magnetic fluxes BF applied to the surfaces 20f of the reinforcing member 20 becomes ½ or less of the magnetic flux density at the center of the surfaces 60f of the first and second groups of permanent magnets 60A and 60B, the influence due to the disadvantages explained above becomes almost zero.

According to the coreless linear motor 1 of the first embodiment, even if the movable member 2 functioning as the armature is coreless, by configuring the coils 3A, 3B, and 3C by the above method, it becomes possible to raise the rigidity of the movable member 2 having the coils 3A, 3B, and 3C. Further preferably, by providing the non-magnetic reinforcing member 20, it becomes possible to rapidly raise the rigidity of the coils 3A, 3B, and 3C and accordingly the movable member 2. As a result, when controlling the drive of the coreless linear motor 1 so that AC currents shifted in phase by 120 degrees are applied to the coils 3A, 3B, and 3C and the movable member 2 is moved in the direct-acting directions A1 and A2, it becomes possible to raise the control loop gain of the coreless linear motor 1. When this coreless linear motor 1 is used, it becomes possible to deal with the positioning control at a nanometer (nm) level resistance to external disturbance.

By making the 3-phase coils 3A, 3B, and 3C (coil assembly 3) a hollow cylindrical state and arranging the coil assembly 3 between the facing first and second groups of permanent magnets 60A and 60B, even if a large induction current flows when for example aluminum, an aluminum alloy, or other material having a low electric resistance is used for the reinforcing member 20, the influence of the magnetic fluxes BF from the first and second groups of permanent magnets 60A and 60B inside the coils 3A, 3B, and 3C is very small, therefore generation of force in the reverse direction to the thrust of the movable member 2 can be suppressed to the lowest limit. As a result, the thrust fluctuation of the coreless linear motor 1 can be greatly suppressed.

When the reinforcing member 20 is made by for example an aluminum alloy, copper alloy, or other metal material having a high heat conductivity, the heat generated in the coils 3A, 3B, and 3C is conducted through the reinforcing member 20 and the spacers 25 to the holding member 10, so the heat of the coils 3A, 3B, and 3C is radiated to the outside of the movable member 2 with a high efficiency. As a result, the temperature rise of the entire coreless linear motor 1 can be suppressed, and it becomes possible to prevent a reduction of the positioning precision due to the heat deformation of the components of the coreless linear motor 1 due to the temperature rise.

When an aluminum alloy, copper alloy, or other material having a low electrical resistance is used for the reinforcing member 20, in comparison with the case where a material having a high electric resistance is used for the reinforcing member 20, the mutual inductance between the coils 3A, 3B, and 3C, and the reinforcing member 20 can be made small, and the reduction of response due to the mutual inductance can be prevented. In other words, the electrical response of the coreless linear motor 1 can be improved.

When an aluminum alloy or other material having a light weight is used for the reinforcing member 20, the movable member 2 can be reduced in weight. When a material having a light weight is used also for the connection portion 51C, the entire coreless linear motor 1 can be further reduced in weight.

Second Embodiment

A coreless linear motor of a second embodiment based on the present invention will be explained with reference to FIG. 6 and FIG. 7.

Figure 6:
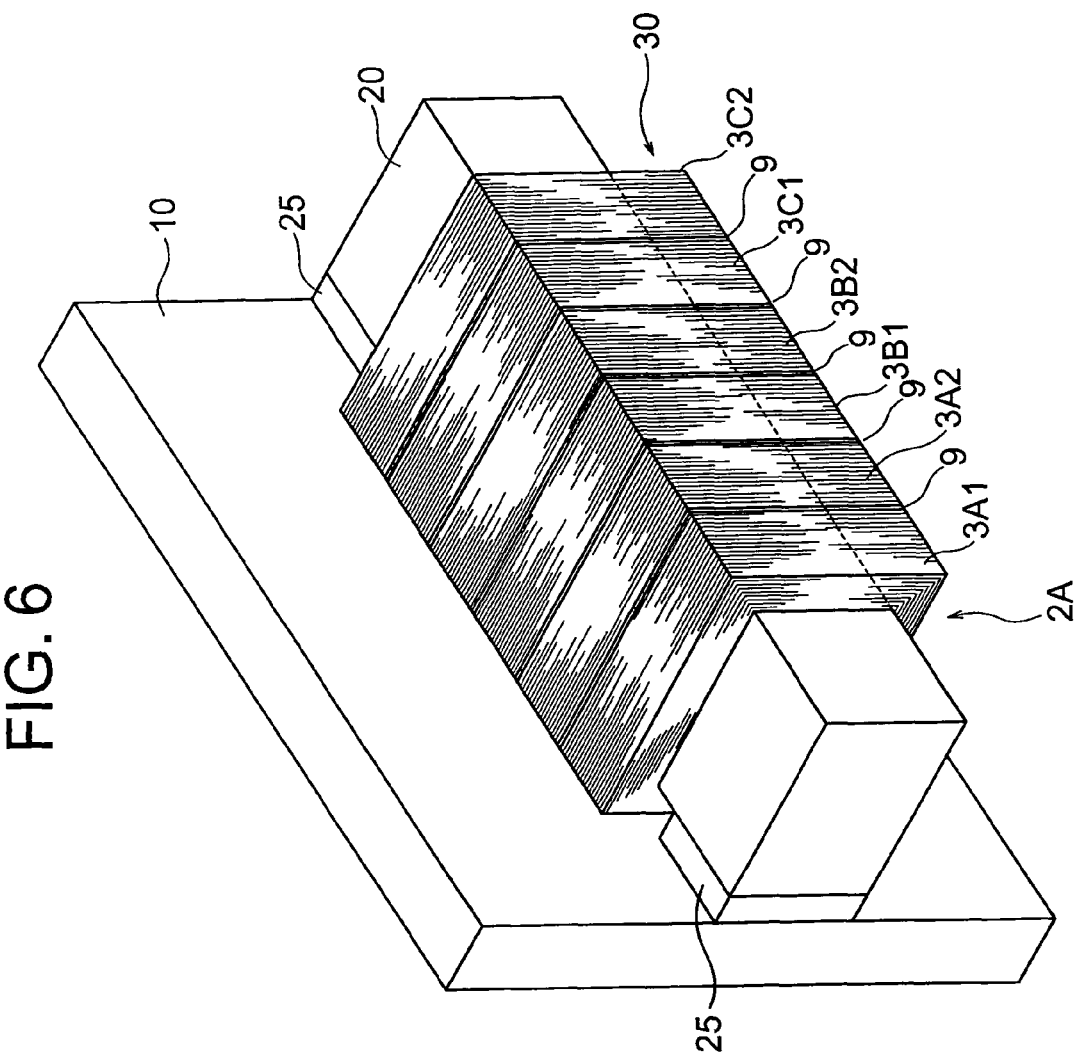
FIG. 6 is a perspective view showing the structure of the movable member of a coreless linear motor of a second embodiment based on the present invention.
Figure 7:
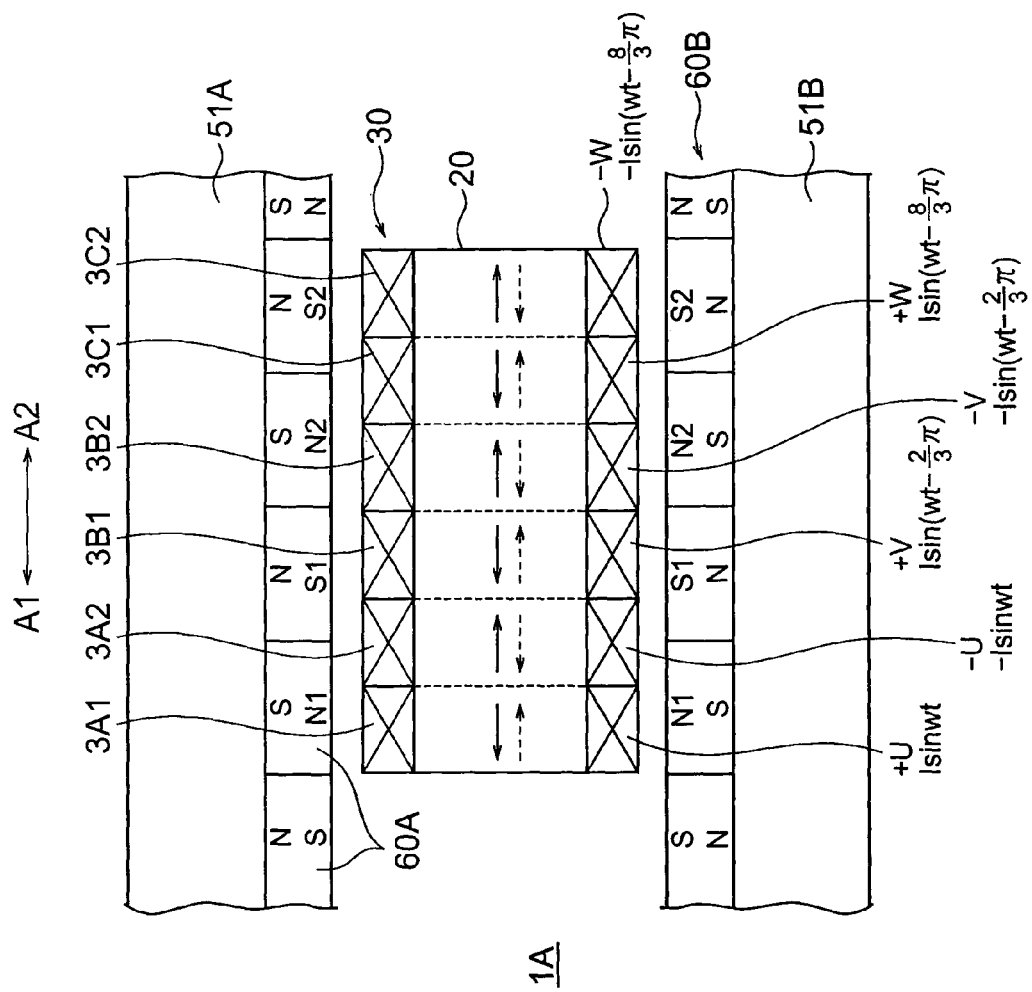
FIG. 7 is a diagram for explaining the operation of the coreless linear motor having the movable member illustrated in FIG. 6.

FIG. 6 is a perspective view showing the structure of the movable member of the coreless linear motor of the second embodiment of the present invention. The basic configuration of a coreless linear motor 1A of the second embodiment is the same as the coreless linear motor 1 of the first embodiment. In FIG. 6, the same notations are used for the same components as those of the first embodiment explained with reference to FIG. 1 to FIG. 5.

A movable member 2A of the coreless linear motor 1A shown in FIG. 6 is provided with a coil assembly 30 constituted by two coil groups consisting of 3-phase coils 3A1, 3B1, and 3C1 of a first group and 3-phase coils 3A2, 3B2, and 3C2 of a second group.

The first coil 3A1 of the first group and the first coil 3A2 of the second group are arranged adjacent to each other, the second coil 3B1 of the first group and the second coil 3B2 of the second group are arranged adjacent to each other, and the third coil 3C1 of the first group and the third coil 3C2 of the second group are arranged adjacent to each other. The first coil 3A2 of the second group and the second coil 3B1 of the first group are arranged adjacent to each other, and the second coil 3B2 of the second group and the third coil 3C1 of the first group are arranged adjacent to each other.

The 3-phase coils 3A1, 3B1, and 3C1 of the first group and the 3-phase coils 3A2, 3B2, and 3C2 of the second group have the same configuration as those of the 3-phase coils 3A, 3B, and 3C in the linear motor 1 of the first embodiment explained with reference to FIG. 1 to FIG. 5. Also, the coil assembly 30 in the coreless linear motor of the second embodiment is formed by the same method as the method of formation of the coil assembly 3 in the coreless linear motor of the first embodiment.

The operation of the coreless linear motor 1A of the second embodiment will be explained with reference to FIG. 7.

The 3-phase coils 3A1, 3B1, and 3C1 of the first group and the 3-phase coils 3A2, 3B2, and 3C2 of the second group face two pairs of permanent magnets, for example, a first N pole permanent magnet N1, a first S pole permanent magnet S1, a second N pole permanent magnet N2, and a second S pole permanent magnet S2.

In the direct-acting directions A1 and A2, for example, the dimensions of the four permanent magnets of the first N pole permanent magnet N1, first S pole permanent magnet S1, second N pole permanent magnet N2, and second S pole permanent magnet S2 in the longitudinal direction of the yoke 51 (direct-acting directions A1 and A2) and the dimensions of the six coils of the first and second groups are substantially the same.

The 3-phase coils 3A2, 3B2, and 3C2 of the second group determine the orientation of winding of coils and apply 3-phase AC currents from a not shown power source so as to generate magnetic fields having reverse phases with respect to the 3-phase coils 3A1, 3B1, and 3C1 of the first group, that is, having phases different by 180 degrees.

In order to impart reverse phase relationships to the magnetic fields generated by the 3-phase coils 3A2, 3B2, and 3C2 of the second group and the 3-phase coils 3A1, 3B1, and 3C1 of the first group, the winding orientations of the 3-phase coils 3A2, 3B2, and 3C2 of the second group and the 3-phase coils 3A1, 3B1, and 3C1 of the first group may be reversed and 3-phase AC currents having the same phase may be applied to the coils of the first group and the second group or the connection method of the coils may be changed.

As an example, for example, when the winding orientations of the 3-phase coils 3A1, 3B1, and 3C1 of the first group and the 3-phase coils 3A2, 3B2, and 3C2 of the second group are the same, the 3-phase AC currents of the U-phase, V-phase, and W-phase are applied to the 3-phase coils 3A1, 3B1, and 3C1 of the first group and 3-phase AC currents of the reversed U-phase (-U-phase), reversed V-phase (-V-phase), and reversed W-phase (-W-phase) different in phases from the above 3-phase AC currents by 180 degrees are applied to the 3-phase coils 3A2, 3B2, and 3C2 of the second group. Due to this, magnetic fields in reverse orientations are generated in the adjacent coils 3A1, 3A2, in the adjacent coils 3B1 and 3B2, and in the adjacent coils 3C1 and 3C2.

These magnetic fields are in reverse phase relationships, therefore magnetic fluxes of magnetic fields are cancelled by each other. As a result, the induction current generated in the reinforcing member 20 fit in the coils can be suppressed. In this way, the induction current flowing in the reinforcing member 20 can be suppressed, therefore the distance between the reinforcing member 20 and the first and second groups of permanent magnets 60A and 60B can be shortened.

Further, the excessive current loss in the reinforcing member 20 can be lowered, and the reduction of the efficiency of the coreless linear motor 1A due to the excessive current loss can be prevented.

In the coreless linear motor of the second embodiment, the magnetic fluxes leaked from the interiors of the adjacent coils 3A1 and 3A2, adjacent coils 3B1 and 3B2, and coils 3C1 and 3C2 in reverse phase relationships are suppressed, therefore the disturbance with respect to the magnetic fields formed by the first and second groups of permanent magnets 60A and 60B can be reduced, and the magnetic saturation of the yoke 51, particularly the first and second facing yoke parts 51A and 51B due to the magnetic fluxes generated by the coils of the first and second groups can be prevented.

Modification of Second Embodiment

A modification of a coreless linear motor of the second embodiment will be explained with reference to FIG. 8.

Figure 8:
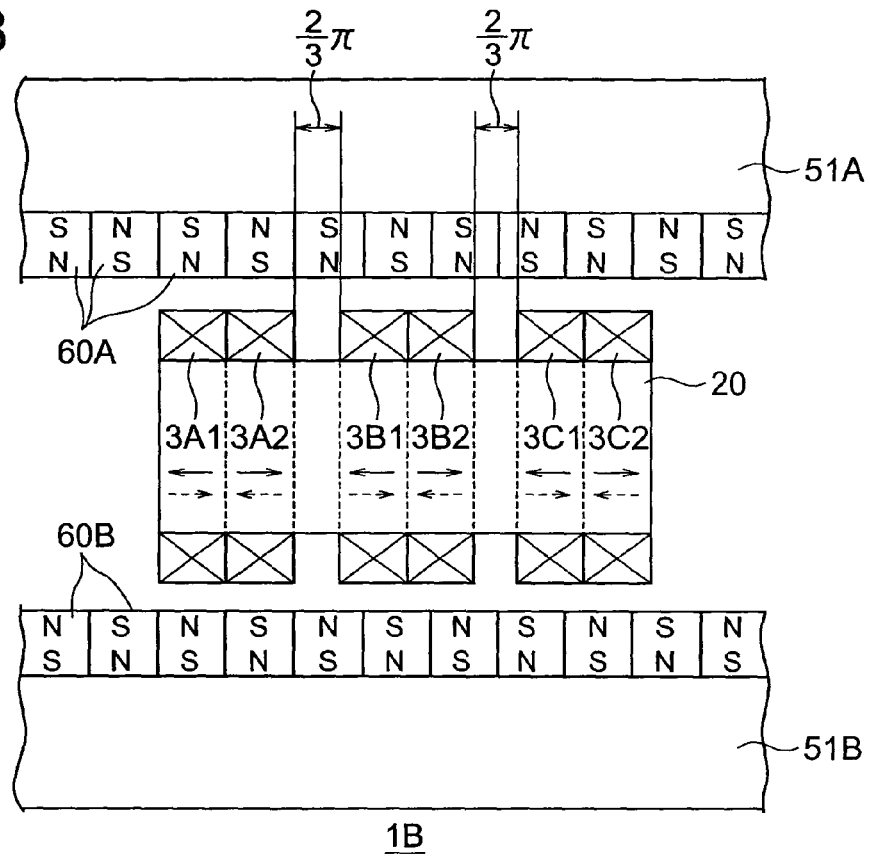
FIG. 8 is a diagram showing a modification of the coreless linear motor of the second embodiment.

In a linear motor 1B illustrated in FIG. 8, the dimensions of the sets of adjacent coils 3A1 and 3A2, coils 3B1 and 3B2, and coils 3C1 and 3C2 are made substantially the same as the dimensions of adjacent two permanent magnets S and N in the first and second groups of permanent magnets 60A and 60B. The sets of coils are arranged so that the left and right permanent magnets are different in phase from each other by $\lambda/3$ radians (60 degrees) or different in phase from one set of permanent magnets by $2\pi/3$ radians (120 degrees).

By generating the magnetic field in each coil in the same way as the linear motor 1A of the second embodiment, the coreless linear motor 1B illustrated in FIG. 8 gives the same mode of operation and effects as those by the linear motor 1A of the second embodiment.

In the configuration of the coils illustrated in FIG. 8, each two coils are constituted as one set and the sets are separated from each other, therefore the heat generated in coils is easily radiated.

Third Embodiment

Figure 9:
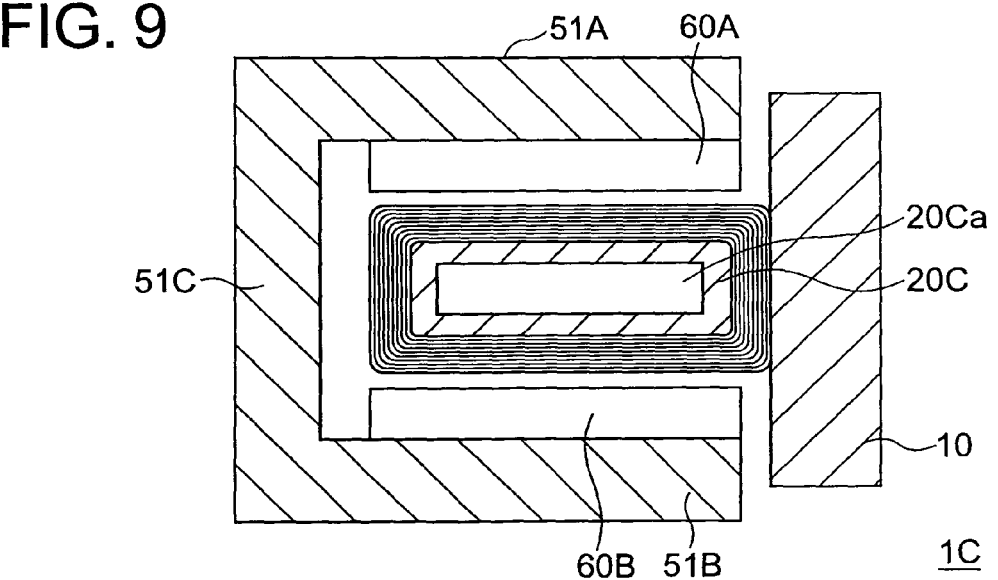
FIG. 9 is a sectional view showing an example of the structure of a coreless linear motor of a third embodiment based on the present invention.

FIG. 9 is a sectional view showing a coreless linear motor of a third embodiment based on the present invention.

In a coreless linear motor 1C of the third embodiment, first and second groups of permanent magnets 60A and 60B, coil assemblies 3 and 30, yoke 51, etc. are the same as those of the first and second embodiments explained above. Below, details unique to the third embodiment will be explained.

In the coreless linear motors of the first and second embodiments, the reinforcing member 20 had a solid rectangular cross-section. In order to further raise the heat radiation property, a through hole 20Ca penetrating along the direct-acting directions A1 and A2 is formed in a reinforcing member 20C of the coreless linear motor 1C shown in FIG. 9. By the through hole 20Ca, the area of the inner surface of the reinforcing member 20C contacting the cooling medium, for example, the air, increases, so the heat generated in the coils is easily radiated off.

The reinforcing member 20C moves along the direct-acting directions A1 and A2 as a portion of the movable member 2, therefore, by running air through the through hole 20Ca at that time, the heat of the coil assemblies 3 and 30 can be radiated off.

When air or another cooling medium is forcibly introduced into the through hole 20Ca, the cooling efficiency further rises.

The function of raising the rigidity of the coil assemblies 3 and 30 by the reinforcing member 20C is the same as that of the first and second embodiments.

By forming the through hole 20Ca in the reinforcing member 20C, the reinforcing member 20C becomes lighter in weight than the solid reinforcing member 20, and the movable member 2 becomes lighter in weight.

Modification of Third Embodiment

Figure 10:
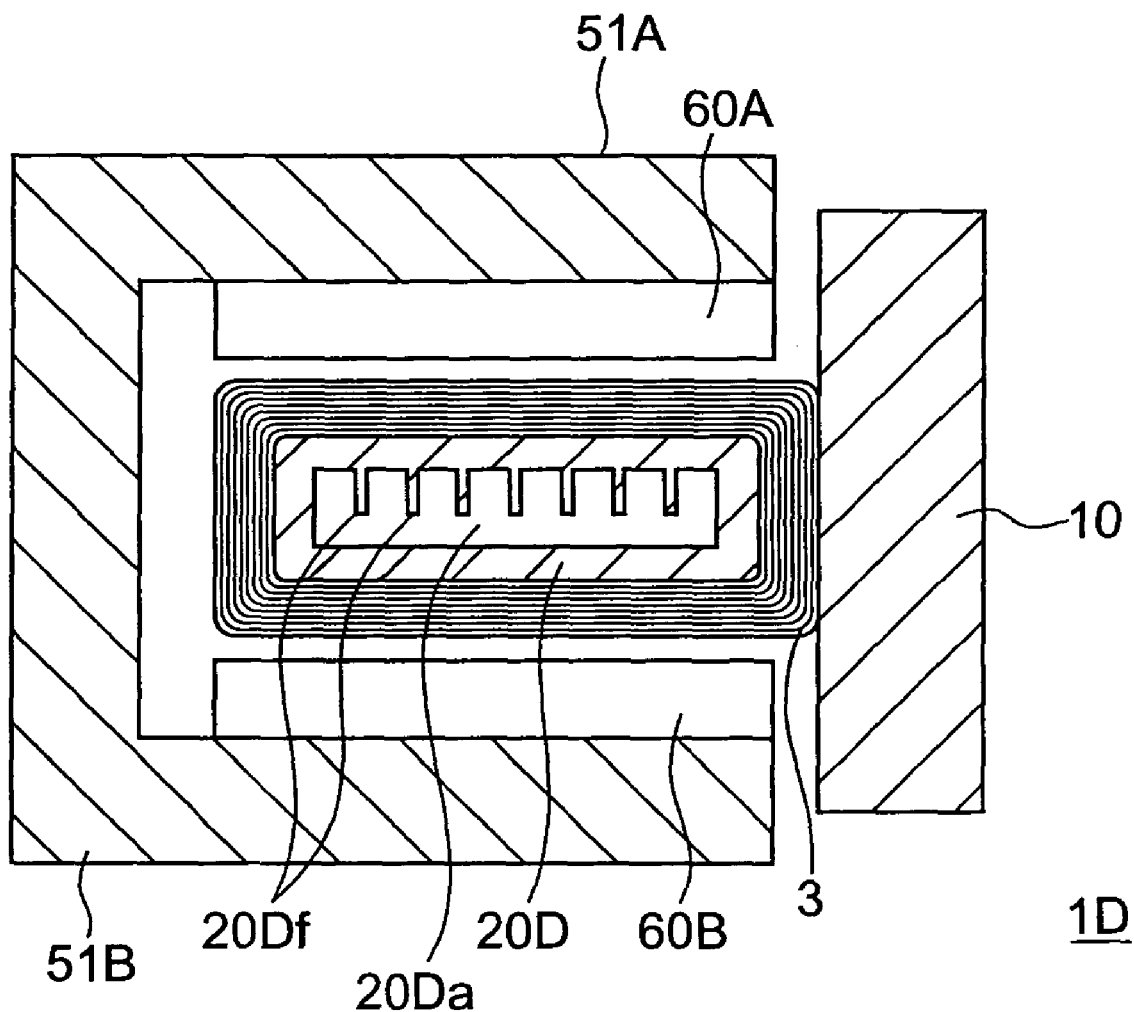
FIG. 10 is a sectional view showing another example of the structure of a reinforcing member in the coreless linear motor of third embodiment.

FIG. 10 is a sectional view showing another example of the structure of the reinforcing member in the coreless linear motor of the third embodiment.

In a reinforcing member 20D in a coreless linear motor 1D shown in FIG. 10, a through hole 20Da running along the direct-acting directions A1 and A2 is formed and heat radiating fins 20Df are formed on the inner wall of the through hole 20Da. By forming the fins 20Df, the surface area of contact with the cooling medium in the reinforcing member 20D becomes large, and heat can be further efficiently radiated in comparison with the case of using the reinforcing member 20C illustrated in FIG. 9.

Fourth Embodiment

A coreless linear motor of a fourth embodiment based on the present invention will be explained with reference to FIG. 11 to FIG. 15.

Figure 11:
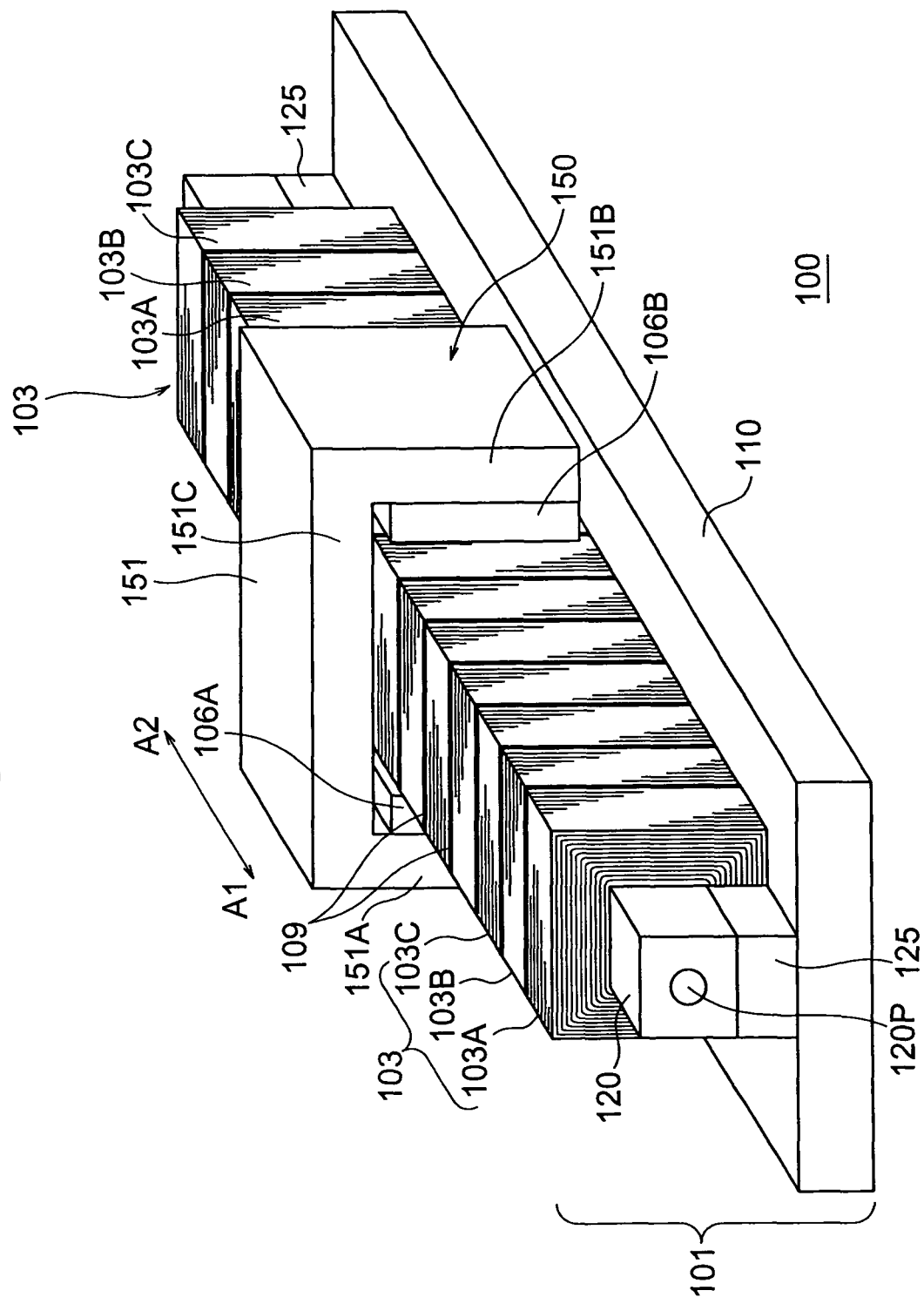
FIG. 11 is a perspective view of a coreless linear motor of a fourth embodiment based on the present invention.

In FIG. 11, a coreless linear motor 100 has a movable member 150 and a fixed member 101. The linear motor 100 of the fourth embodiment is different from the first to third embodiments. The fixed member 101 functions as the armature, and the movable member 150 functions as the stator. Namely, the movable member 150 having a yoke 151 and first and second groups of permanent magnets 106A and 106B moves relatively in the direct-acting directions A1 and A2 with respect to the fixed member 101.

The fixed member 101 has a coil assembly 103, a reinforcing member 120 for reinforcing the coil assembly 103 by raising the rigidity of the coil assembly 103, and a holding member 110 for holding the coil assembly 103 and the reinforcing member 120.

The holding member 110 is made of a plate shaped member in the same way as the holding member 10 of the first to third embodiments and is formed by for example stainless steel, an aluminum alloy, or other non-magnetic metal. The holding member 110 plays the role of holding the reinforcing member 120 via the spacers 125 and further holding the coil assembly 103. The holding member 110 is fixed to a not illustrated base etc.

In the coil assembly 103, a plurality of sets of coils each constituted by three 3-phase coils 103A, 103B, and 103C are continuously combined. The adjacent portions of the 3-phase coils 103A, 103B, and 103C in each set, in the same way as the first to third embodiments, are connected using an electrical insulation member 109 the same as the electrical insulation material 9 so as to form the set of coils. The method of formation of each set of 3-phase coils 103A, 103B, and 103C is the same as the method of formation of the coil assembly 3 of the first to third embodiments. In the longitudinal direction of the yoke 151, the adjacent portions of the 3-phase coils 103A, 103B, and 103C of each set are connected by using the electrical insulation material 109 to form the coil assembly 103.

The total length of the coil assembly 103 comprised of sets of coils each including the 3-phase coils 103A, 103B, and 103C is longer than the coil assembly 3 made of three coils of the first embodiment.

Figure 12:
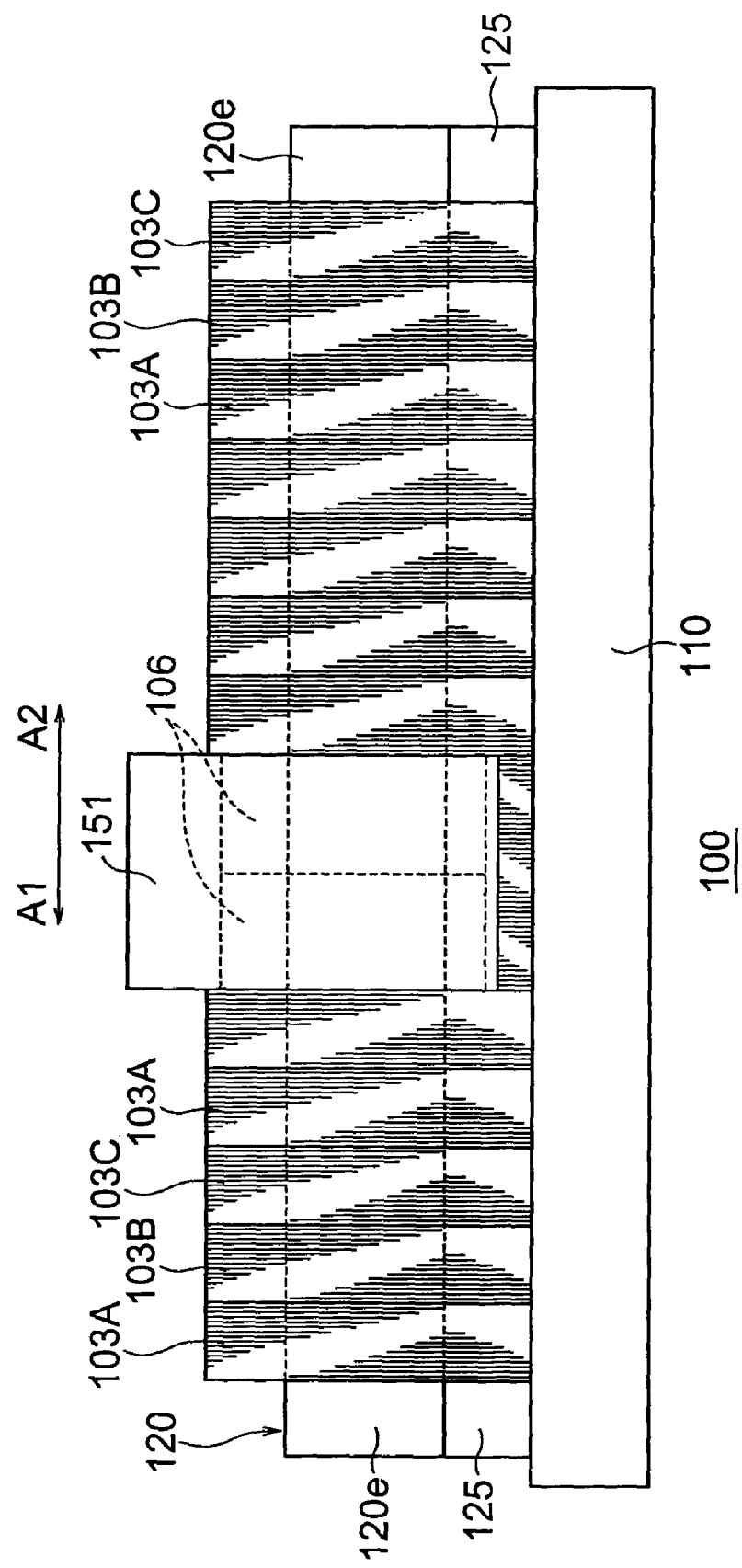
FIG. 12 is a side view of the coreless linear motor illustrated in FIG. 11.

As illustrated in FIG. 11 and FIG. 12, the reinforcing member 120 fixed to the holding member 110 via the spacers 125 contacts the inner wall of the coil assembly 103, passes through the coil assembly 103, and supports the coil assembly 103.

The reinforcing member 120 functions to radiate the heat from the coil assembly 103 to the outside other than functioning to raise the strength of the coil assembly 103 in the same way as the reinforcing members 20, 20C, and 20D of the first to third embodiments. At the center portion of the reinforcing member 120, a through hole (flow path) 120p in which the cooling medium flows is formed along the longitudinal direction of the yoke 151.

The reinforcing member 120 is formed by a non-magnetic, light weight material the same as that for the reinforcing member 20 explained with reference to FIG. 1 to FIG. 5, for example, aluminum or an aluminum alloy.

As shown in FIG. 12, the ends 120e of the reinforcing member 120 project from the two ends of the coil assembly 103 and are fastened to the holding member 110 by not illustrated fastening members via the spacers 125.

The spacers 125, in the same way as the spacers 25 of the first to third embodiments, function to fix the reinforcing member 120 to the holding member 110 and also function to conduct the heat of the reinforcing member 120 to the holding member 110, so are formed by aluminum, an aluminum alloy, or other non-magnetic material having a high heat conductivity.

The holding member 110 holds the facing outer circumferential surfaces of the coil assembly 103 over the entire surface. As a result, the rigidity of the coil assembly 103 having a relatively long total length rapidly rises.

The movable member 150 has the yoke 151 and a first group of permanent magnets 106A and a second group of permanent magnets 106B having the same configuration as that of the first and second groups of permanent magnets 60A and 60B of the first to third embodiments and is movably supported in the direct-acting directions A1 and A2 by a not illustrated guide mechanism.

Figure 13:
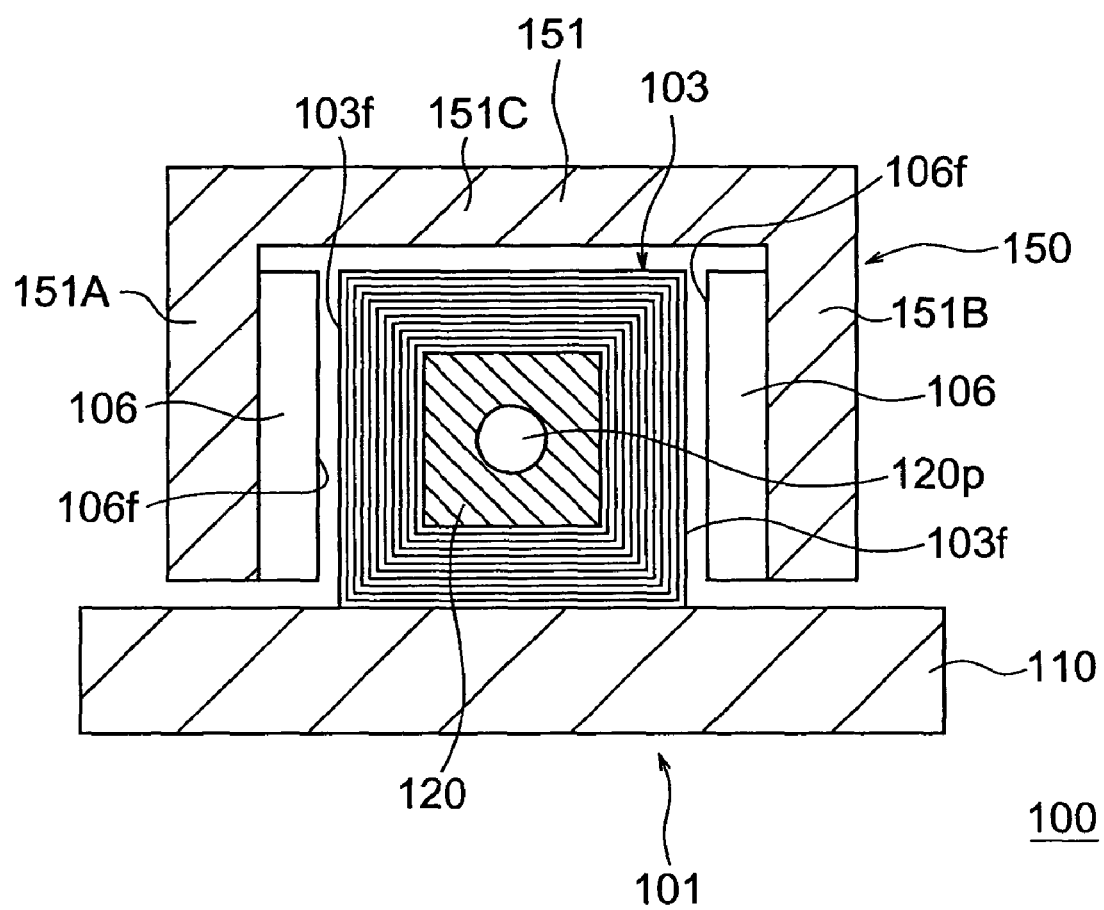
FIG. 13 is a sectional view along the plane perpendicular to the direct-acting directions of the movable member and the fixed member of the coreless linear motor illustrated in FIG. 11.

The yoke 151 shown in FIG. 13 is the same as the yoke 51 explained with reference to FIG. 4. Namely, the first and second facing yoke parts 151A and 151B have surfaces facing each other. The first and second facing yoke parts 151A and 151B facing each other across the first distance D1 and a connection yoke part 151C arranged vertical to these facing yoke parts and connecting firsts ends of the first and second facing yoke parts 151A and 151B along the direct-acting directions A1 and A2 are integrally formed. The facing yoke parts 151A and 151B and the connection yoke part 151C may be formed as different members and joined. The yoke 151 can be formed by iron or another magnetic material as a whole in the same way as the yoke 51 explained with reference to FIG. 4, but from the viewpoint of the reduction of weight of the movable member 150, a magnetic material may be used for the facing yoke parts 151A and 151B and aluminum, an aluminum alloy, or another non-magnetic material may be used for the connection yoke part 151C.

Figure 14:
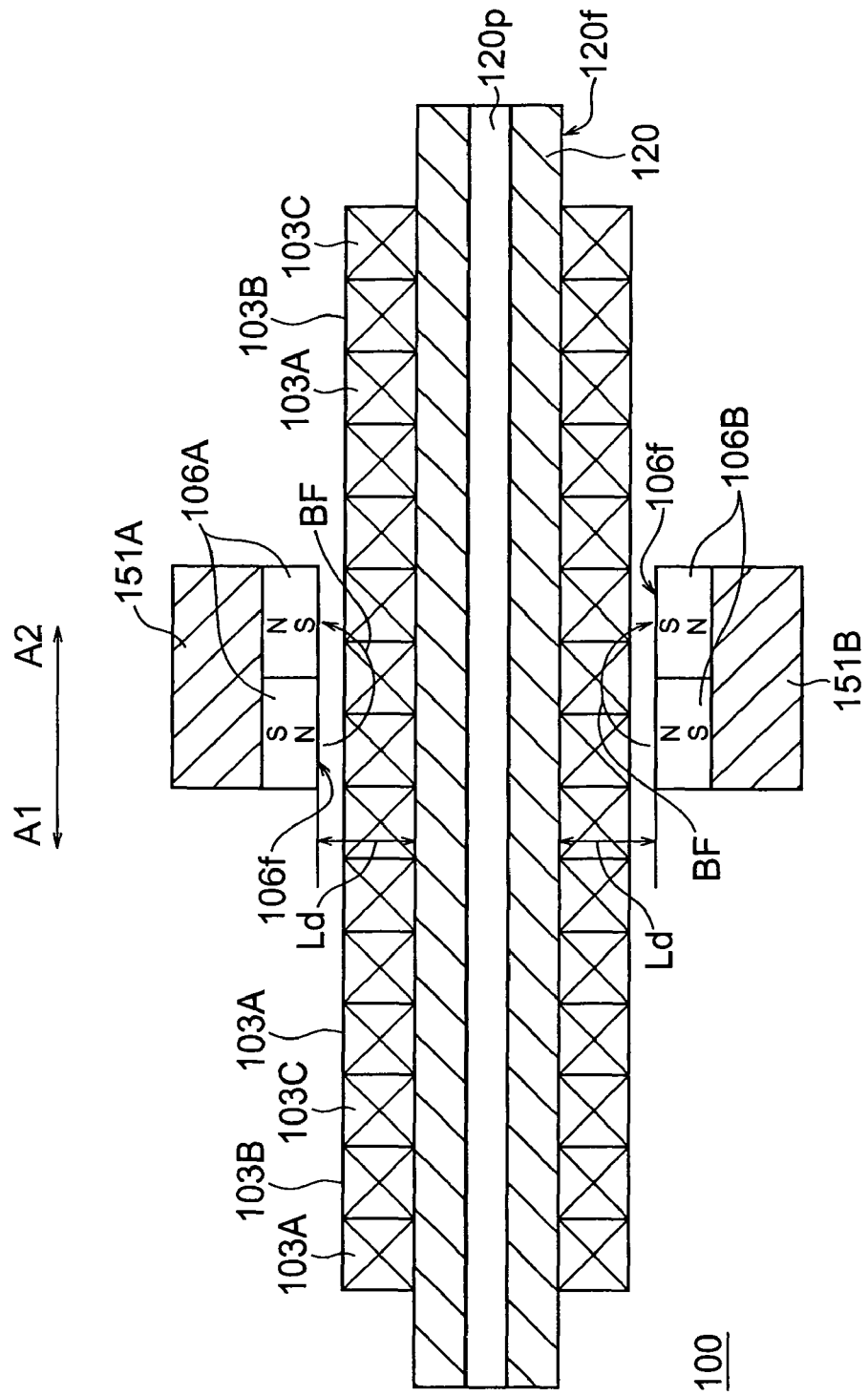
FIG. 14 is a sectional view in a horizontal plane direction of the movable member and the fixed member of the coreless linear motor illustrated in FIG. 11.

As illustrated in FIG. 14, the first and second groups of permanent magnets 106A and 106B made of pairs of N pole and S pole permanent magnets are formed into rectangular plate shapes in outer shape in the longitudinal direction, have the same dimensions, and fixed to the facing surfaces of the facing yoke parts 151A and 151B. The magnetic poles of the facing permanent magnets are the same.

The coils 103A, 103B, and 103C of each set forming the coil assembly 103 have a square or rectangular cross-sectional contour shape, therefore, as shown in FIG. 13, facing surfaces 106f of the facing first and second groups of permanent magnets 106A and 106B face each other across a predetermined distance (space) with respect to the outer circumferential surfaces 103f of the coil assembly 103. The facing surfaces 106f and the outer circumferential surfaces 103f are arranged substantially parallel.

The operation of the coreless linear motor 100 of the fourth embodiment will be explained with reference to FIG. 14.

In the direct-acting directions A1 and A2, the dimensions of the adjacent pairs of permanent magnets N and S and the dimensions of a set of three coils 103A, 103B, and 103C substantially match.

In the same way as that explained in the first to third embodiments, almost no magnetic flux BF of the permanent magnets facing each other across a set of three coils 103A, 103B, and 103C extends from one of the facing permanent magnets to the other since the magnetic poles of the facing permanent magnets are the same. It mainly extends from the permanent magnet N toward the permanent magnet S which are adjacent in the longitudinal direction of the yoke 151. Accordingly, the magnetic fluxes BF of the permanent magnets N and S are mainly distributed near the surfaces of the adjacent pairs of permanent magnets N and S and do not easily reach the reinforcing member 120 inside the 3-phase coils 103A, 103B, and 103C facing the permanent magnets N and S.

When AC currents shifted in phase by 120 degrees are applied to the 3-phase coils 3A, 3B, and 3C, a magnetic field is generated due to electromagnetic induction, and an induction current flows in the reinforcing member 120. When using aluminum, an aluminum alloy, or other non-magnetic metal having a low electric resistance for the reinforcing member 120, a large induction current flows. At this time, when the magnetic flux density of the magnetic fields of the permanent magnets N and S reaching the inside of the 3-phase coils 103A, 103B, and 103C is large, a force in the reverse direction to the thrust with respect to the movable member 150 is generated. In order to prevent the generation of force in the reverse direction to the thrust, the distance Ld between the permanent magnets N and S and the reinforcing member 120 is secured in the same way as the first embodiment. Namely, it is necessary to secure the distance (third distance) between the surfaces 106f of the first and second groups of permanent magnets 106A and 106B and surfaces 120f of the reinforcing member 120 facing these to exactly a certain length.

In the fourth embodiment as well, it was learned that, in the same way as the first embodiment, when using an aluminum alloy for the reinforcing member 120, if setting the distance Ld so that the density of the magnetic fluxes BF applied to the surfaces 102f of the reinforcing member 120 becomes ½ or less of the magnetic flux density at the center of the surfaces of the first and second groups of permanent magnets 106A and 106B, the flux has almost no influence.

Due to this, even in the coreless linear motor 100 of the fourth embodiment, the same effects as those by the coreless linear motors of the first to third embodiments are obtained.

The fixed member and the movable member of the coreless linear motor of the fourth embodiment are reverse to the fixed member and movable member in the coreless linear motors of the first to third embodiments, but even when the fixed member and the movable member are reversed, the same effects as those by the first to third embodiments are exhibited. Namely, in the present invention, the movable member and the fixed member may be constituted movable relative to each other.

In the coreless linear motor of the fourth embodiment, the coil assembly 103 is fixed, therefore the wiring to the coil assembly 103 becomes easy.

In the coreless linear motor of the fourth embodiment, the reinforcing member 120 is in the fixed member, therefore cooling is easy.

Figure 15:
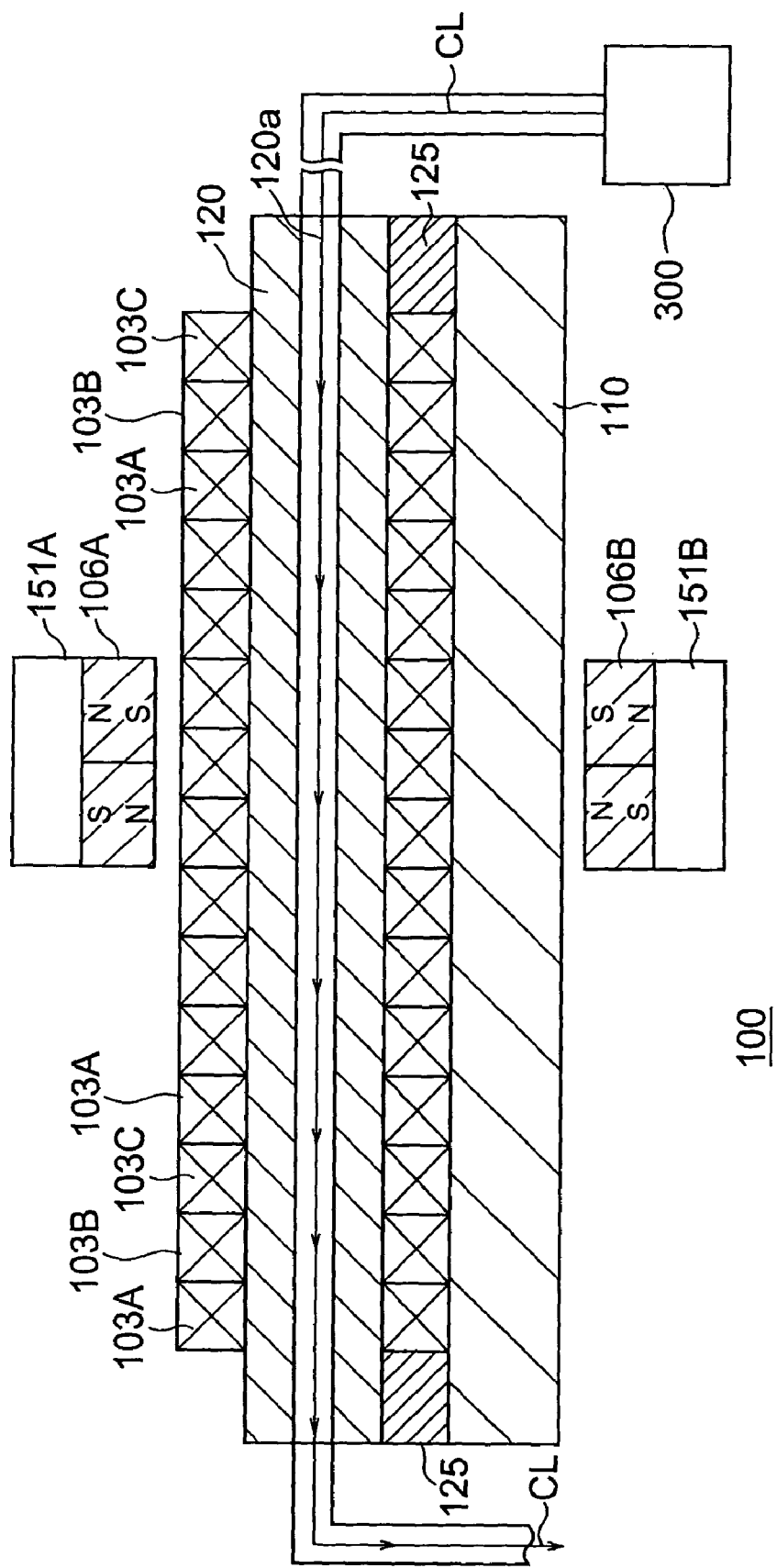
FIG. 15 is a sectional view showing an example of a cooling method in the coreless linear motor illustrated in FIG. 11.

An example of the cooling method of the linear motor 100 of the fourth embodiment will be explained with reference to FIG. 15.

A supply source 300 for supplying the cooling medium is connected to one end of the through hole (flow passageway) 120p formed in the reinforcing member 120. A cooling medium CL is supplied to the through hole 120p. In the present embodiment, the reinforcing member 120 is located in the fixed member 101, therefore, as the cooling medium CL, for example a liquid such as water having a high heat capacity in comparison with air can be used. The cooling medium CL supplied from one end of the through hole 120p passes through the through hole 120p, efficiently absorbs the heat of the reinforcing member 120 to become heated, and is discharged from the other end of the through hole 120p. As a result, the temperature of the coreless linear motor 100 of the fourth embodiment can be easily and sufficiently controlled, and the entire coreless linear motor is not affected by a temperature rise. When such a coreless linear motor is used, there is merit particularly in nano positioning control or other precision control.

Fifth Embodiment

Figure 16:
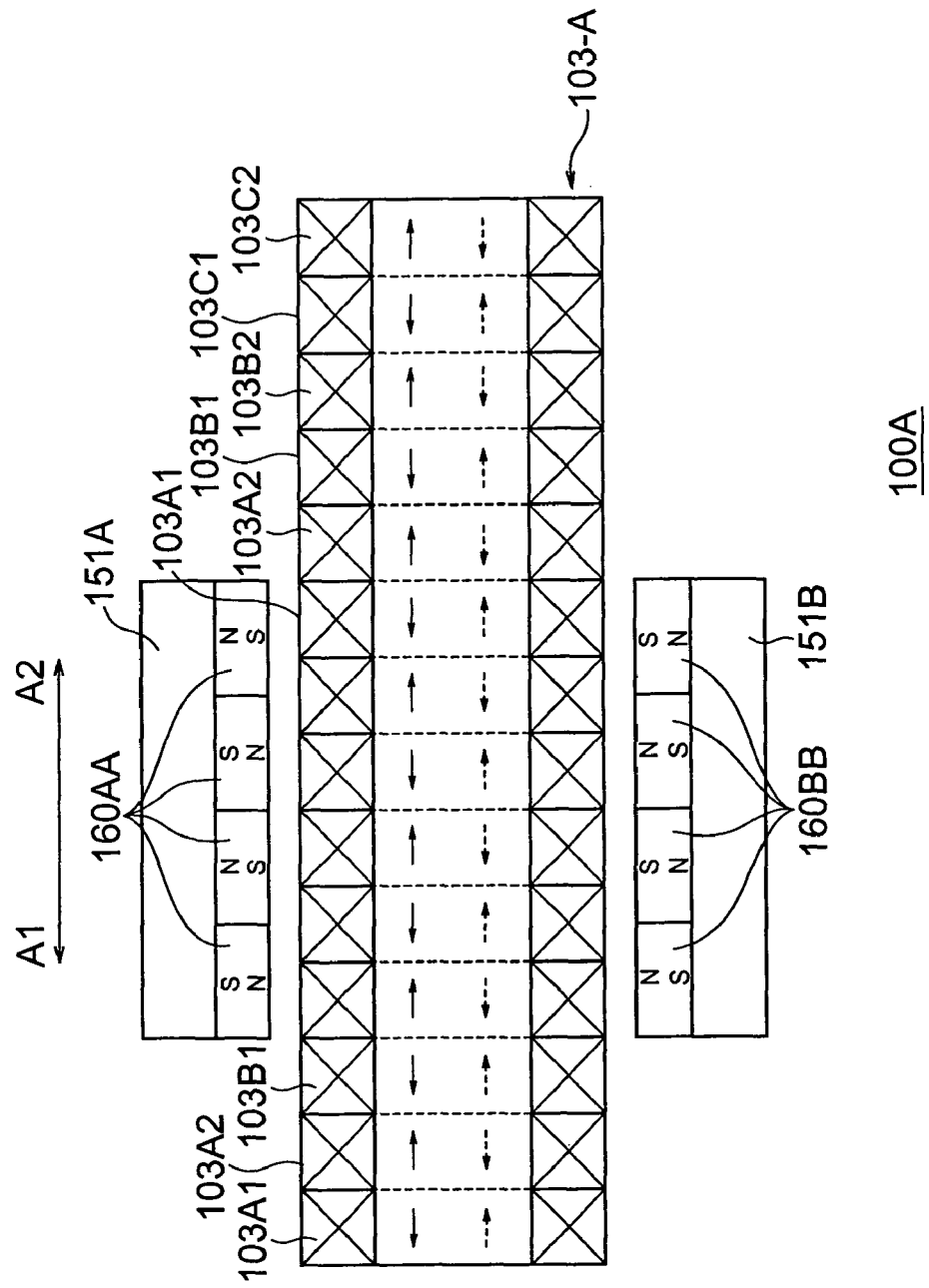
FIG. 16 is a diagram showing the configuration of a coreless linear motor of a fifth embodiment based on the present invention.

FIG. 16 is a diagram showing the configuration of a coreless linear motor of a fifth embodiment based on the present invention.

The basic configuration of a coreless linear motor 100A according to the fifth embodiment is the same as that of the coreless linear motor 100 of the fourth embodiment. In FIG. 16, the same notations are used for the same components as those of the coreless linear motor of the fourth embodiment illustrated with reference to FIG. 11 to FIG. 15.

In the coreless linear motor 100A shown in FIG. 16, in the same way as the coreless linear motor 100 of the fourth embodiment, the fixed member having the reinforcing member 120 and the coil assembly 103 functions as the armature. This motor has a yoke 151 having a not illustrated connection yoke part, first and second facing yoke parts 151A and 151B, and a movable member having first and second groups of permanent magnets 106AA and 106BB.

In the first and second facing yoke parts 151A and 151B, two pairs of, that is, four, permanent magnets N and S forming the first group of permanent magnets 106AA and second group of permanent magnets 106BB are arranged. These are arranged so that the polarities of the permanent magnets N and S are alternately reversed along the direct-acting directions A1 and A2 and arranged so that the polarities of the permanent magnets N and S in the facing first and second groups of permanent magnets 106AA and 106BB become the same.

The coil assembly 103 in the coreless linear motor 100A has a first coil assembly 103A having a plurality of sets each constituted by 3-phase coils 103A, 103B, and 103C and a second coil assembly 103B having a plurality of sets each constituted by 3-phase coils 103A2, 103B2, and 103C2. The coils 103A1 and 103A2, the coils 103B1 and 103B2, and the coils 103C1 and 103C2 are arranged adjacent to each other. The coil 103A2 is arranged between the coils 103A1 and 103B1, the coil 103B2 is arranged between the coils 103B1 and 103C1, and the coil 103C2 is arranged between the coils 103C1 and 103A1.

The coils 103A2, 103B2, and 103C2 generate magnetic fields different in phases by 180 degrees with respect to the coils 103A1, 103B1, and 103C1.

The 3-phase coils 103A1, 103B1, and 103C1 and the 3-phase coils 103A2, 103B2, and 103C2 face two pairs of, that is, four, adjacent permanent magnets N and S. The lengths of the four permanent magnets N and S and the lengths of six coils in the direct-acting directions A1 and A2 are substantially the same.

When the 3-phase AC currents of the U-phase, V-phase, and W-phase different in phases by 120 degrees are applied to the 3-phase coils 103A1, 103B1, and 103C1 and 3-phase AC currents of the -U-phase, -V-phase, and -W-phase different in phases by 180 degrees from the U-phase, the V-phase, and the W-phase are applied to the 3-phase coils 103A2, 103B2, and 103C2, magnetic fields in reverse orientations are generated in the coils 103A1 and 103A2, in the coils 103B1 and 103B2, and in the coils 103C1 and 103C2. As a result, the fixed member and the movable member are reverse, but the mode of operation and effects the same as those of the coreless linear motor of the second embodiment illustrated in FIG. 7 are obtained.

Sixth Embodiment

A coreless linear motor of a sixth embodiment of the present invention will be explained with reference to FIG. 17 and FIG. 18.

Figure 17:
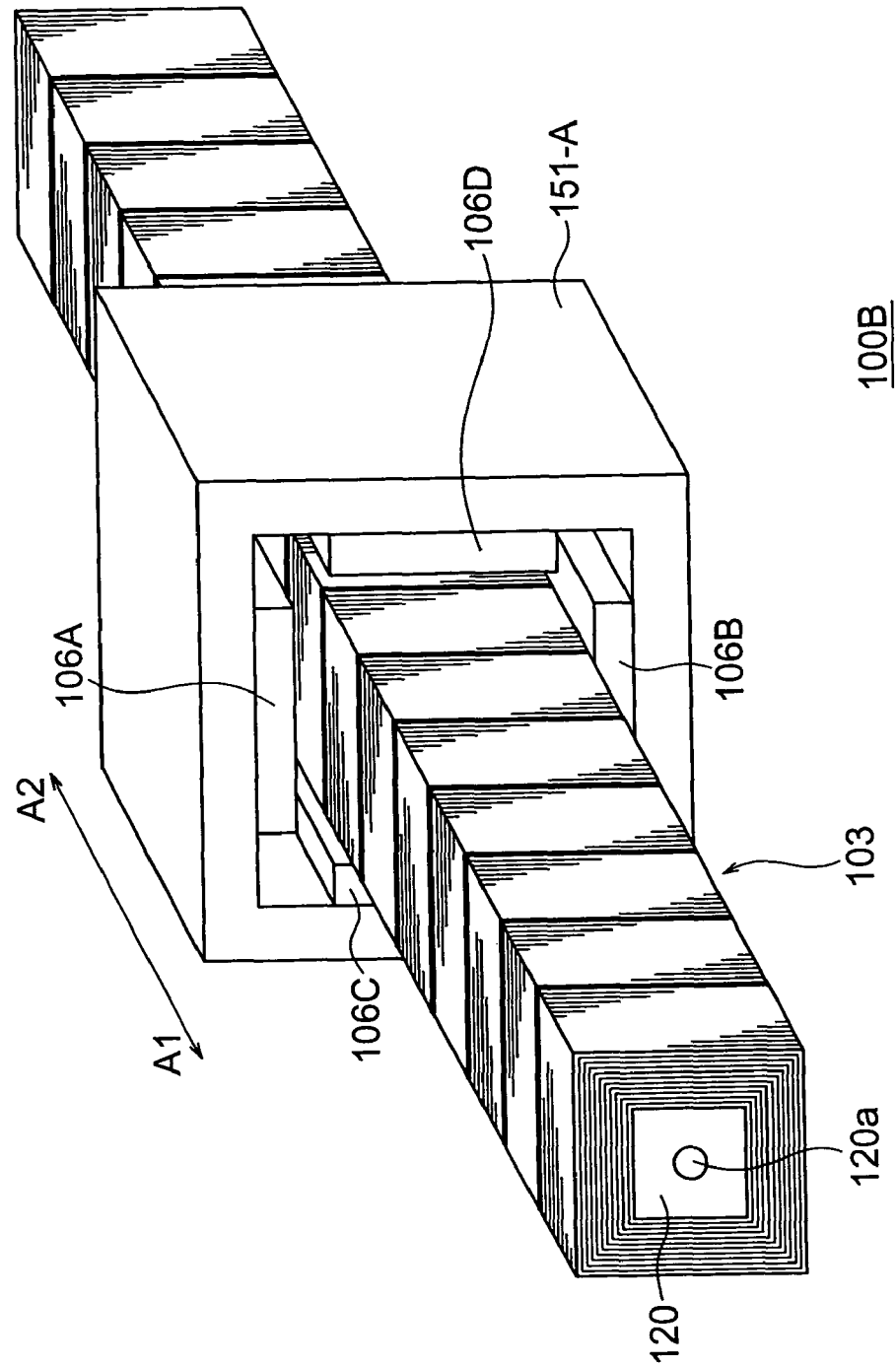
FIG. 17 is a diagram showing the configuration of a coreless linear motor of a sixth embodiment based on the present invention.
Figure 18:
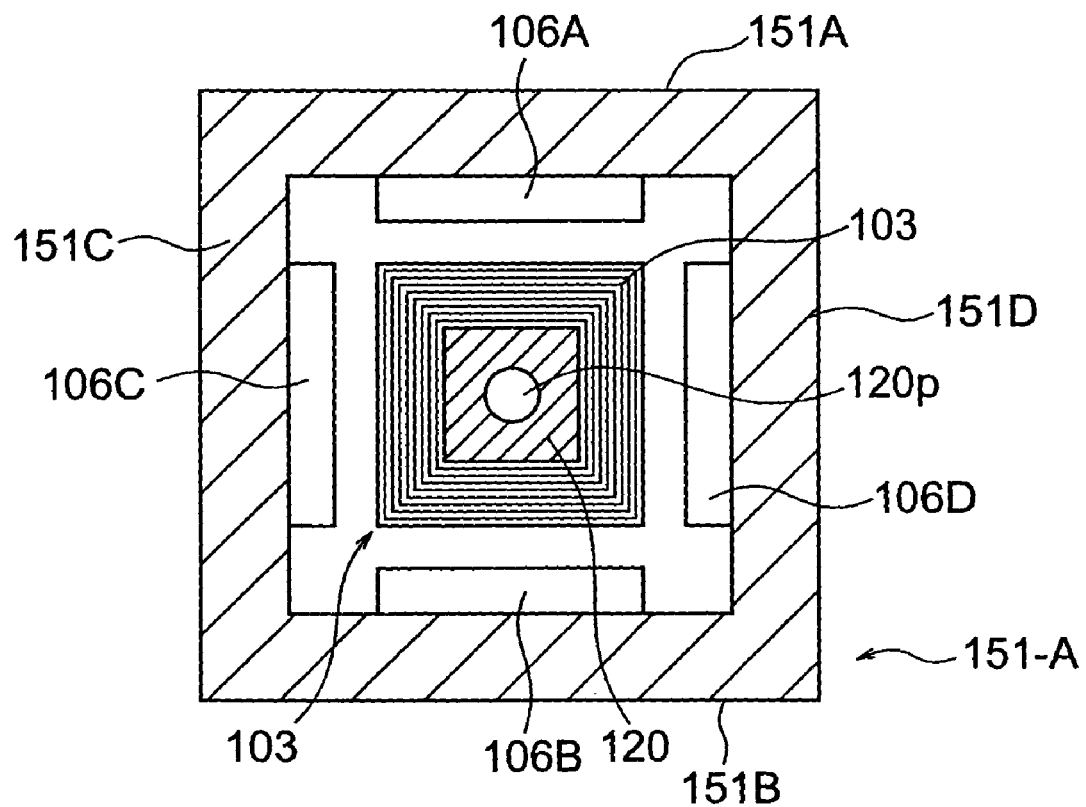
FIG. 18 is a sectional view showing the structure of the movable member and the fixed member of the coreless linear motor illustrated in FIG. 17.

FIG. 17 is a diagram showing the configuration of a coreless linear motor 100B of the sixth embodiment based on the present invention. FIG. 18 is a sectional view showing the structure of the movable member and the fixed member of the coreless linear motor 100B shown in FIG. 17.

In the coreless linear motor 100B, a yoke 151-A having four yoke sides 151A to 151D is formed to a square or rectangular cylindrical outer shape. On the inner walls of the four yoke sides, a first group of permanent magnets 106A, a second group of permanent magnets 106B, a third group of permanent magnets 106C, and a fourth group of permanent magnets 106D are arranged. The first group of permanent magnets 106A and the second group of permanent magnets 106B face each other, while the third group of permanent magnets 106C and the fourth group of permanent magnets 106D face each other. These groups of permanent magnets face four outer circumferential surfaces of the coil assembly 103.

In the coreless linear motor 100B, by employing a configuration making the four surfaces of the coil assembly 103 face the four groups of permanent magnets 106A, 106B, 106C, and 106D4, the efficiency of utilization of magnetic fields of the groups of permanent magnets 106A, 106B, 106C, and 106D4 utilized by the coil assembly 103 rises and the thrust etc. of the movable member made of the yoke 151A-1 and groups of permanent magnets 106A, 106B, 106C, and 106D4 can be raised.

The reinforcing member 120 and the through hole 120a give the same cooling effect as that by the reinforcing member 120 and the through hole 120a explained with reference to FIG. 13.

In the above first to sixth embodiments, the sectional shape of coils was made a square or rectangular shape and the cross-sections of the groups of permanent magnets were formed to flat plate shapes, but the shape of the coreless linear motor of the present invention is not limited to this. For example, the sectional shape of the coils may be made square, circular, oval, or other shapes. The permanent magnets can be curved in accordance with these shapes. Further, the shape of the yokes can be changed matching with this.

Further, in the above first to sixth embodiments, the configuration was employed of inserting the reinforcing member into the coils after forming the coils in the cylindrical state, but the electrically insulated conductive wire may be directly wound around the periphery of the reinforcing member.

Seventh Embodiment

A coreless linear motor of a seventh embodiment based on the present invention will be explained with reference to FIG. 19 to FIG. 22.

In the coreless linear motors of the embodiments explained above, in order to raise the rigidity of the coils, the reinforcing member 20 was used, but there is a possibility that the mass of the movable member becomes large due to the usage of the reinforcing member 20 and the control response of the coreless linear motor is lowered. Further, when stainless steel or another non-magnetic metal is used as the holding plate of the coils, since the holding plate is in the path of the magnetic flux of the magnetic circuit, the flow of the induction current in the holding plate when the holding plate is moved straight by the movable portion generates a force in the reverse direction to the thrust. This sometimes becomes a cause of thrust fluctuation. The embodiment explained below overcomes the above problem. Namely, in the coreless linear motor based on the following embodiment, the armature is reduced in weight, and the thrust fluctuation is reduced.

Figure 19:
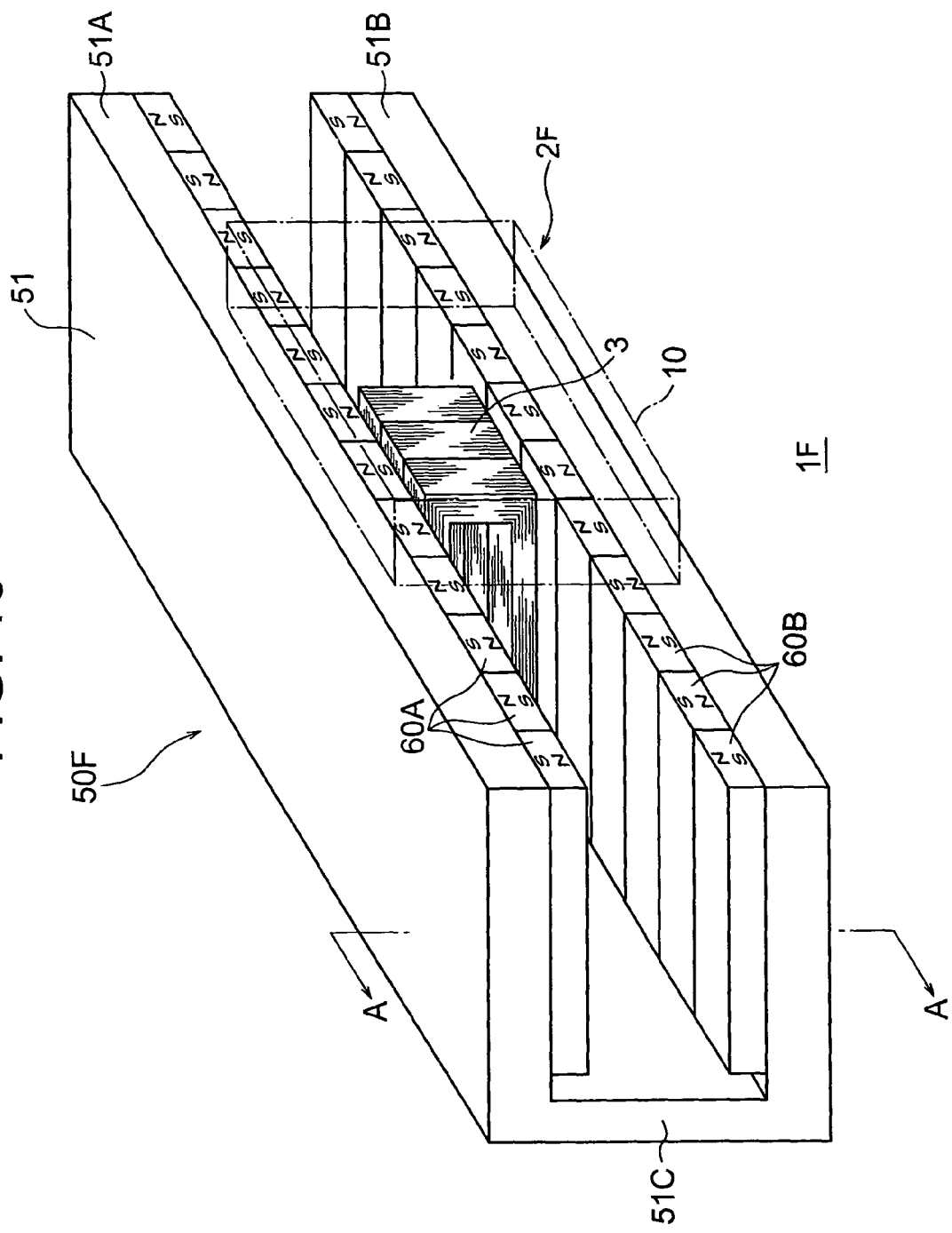
FIG. 19 is a perspective view showing the structure of a coreless linear motor of a seventh embodiment based on the present invention.
Figure 20:
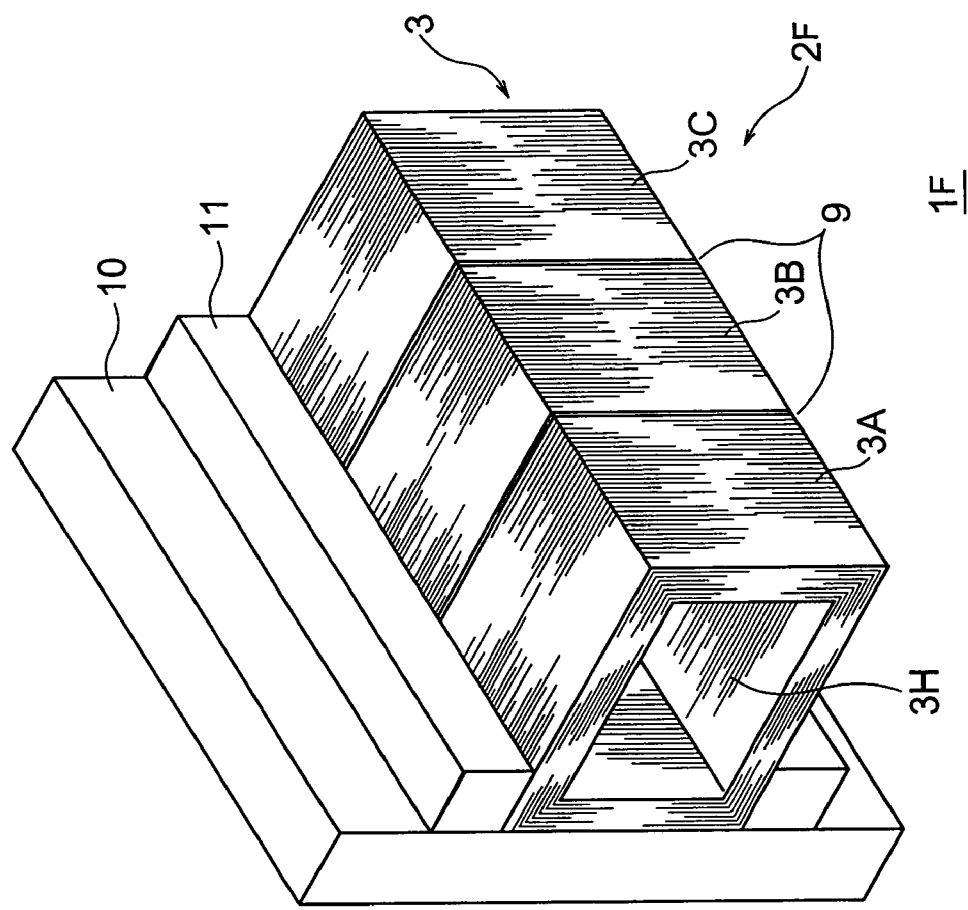
FIG. 20 is a perspective view showing the structure of the movable member in the coreless linear motor illustrated in FIG. 19.

FIG. 19 is a perspective view showing the structure of the coreless linear motor according to the seventh embodiment based on the present invention.

A coreless linear motor 1F of the seventh embodiment has a movable member 2F functioning as the armature and a fixed member 50F.

The fixed member 50F has a yoke 51 and first and second groups of permanent magnets 60A and 60B.

The structure and arrangement of the yoke 51 and the first and second groups of permanent magnets 60A and 60B are the same as those of the first to third embodiments. The direct-acting directions A1 and A2 are the directions in which the movable member 2F moves.

In the yoke 51 illustrated in FIG. 21, in the same way as the yoke 51 explained with reference to FIG. 4, the first and second facing yoke parts 51A and 51B and the connection yoke part 51C are integrally formed, and the outside surfaces are fixed to the base etc. The first and second facing yoke parts 51A and 51B and the connection yoke part 51C may be formed as different members. In that case, in the same way as the yoke 51 of the first embodiment, a configuration may be employed using a ferro-magnetic member for the first and second facing yoke parts 51A and 51B and using a non-magnetic member for the connection yoke part 51C. For the yoke 51, from the viewpoint of the reduction of weight, use may be made of aluminum, aluminum alloy, or another light weight metal having a high specific strength or a reinforced plastic or other non-magnetic material.

The first and second groups of permanent magnets 60A and 60B, in the same way as those explained in the first to third embodiments, have a plurality of pairs of permanent magnets N and S. The conditions of arrangement of the magnetic poles, outer shape, and conditions of dimensions are the same as those of the first to third embodiments.

As illustrated in FIG. 19, the movable member 2F has a coil assembly 3 having coils 3A, 3B, and 3C, a holding member 10 having a coil assembly 3, and a fastening member 11. In this movable member 2F, the reinforcing member 20 as in the coreless linear motor of the first embodiment or the like is not fit in the hollow portion 3H of the coils 3A, 3B, and 3C.

The holding member 10 is the same as the holding member 10 in the coreless linear motor of the first embodiment and is formed by for example stainless steel, aluminum alloy, or other metal. The holding member 10 functions to hold the coil assembly 3 and is movably supported in the direct-acting directions A1 and A2 by a not illustrated guide mechanism in the same way as the first embodiment.

The 3-phase coils 3A, 3B, and 3C constituting the coil assembly 3 are obtained, in the same way as the first embodiment, by for example coating a wet binder on conductive wires covered by the electrical insulation material 9, arranging and winding these in multiple layers in a cylindrical state, and curing the binder for fastening. In the coils 3A, 3B, and 3C, the contour of the cross section is rectangular. Also, the method of production is the same as that of the first embodiment. For example, after forming the 3-phase coils 3A, 3B, and 3C in cylindrical shapes, the end surfaces are connected with each other by the non-magnetic electrical insulation member 9 to thereby form the coil assembly 3. The electrical insulation member 9 is for example a glass epoxy resin or a hard alumite-treated aluminum alloy.

In the sectional shape of the coils 3A, 3B, and 3C, as explained with reference to FIG. 4, the length a of each of the sides facing the first and second groups of permanent magnets 60A and 60B is longer than the length b of the sides other than these.

The coil assembly 3 has a hollow portion 3H of a square contour running through it along the longitudinal direction. The winding directions of the 3-phase coils 3A, 3B, and 3C are all the same.

By imparting the above configuration to the 3-phase coils 3A, 3B, and 3C, in the same way as the first embodiment, the sectional secondary moment can be largely obtained, and the rigidity of the coils 3A, 3B, and 3C, particularly the bending and shearing rigidities, rise. Further, the rigidity of the coils 3A, 3B, and 3C per se rises and, at the same time, the coils 3A, 3B, and 3C have the hollow portion 3H. Since there is no reinforcing member 20, the movable member 2F is light in weight.

Figure 21:
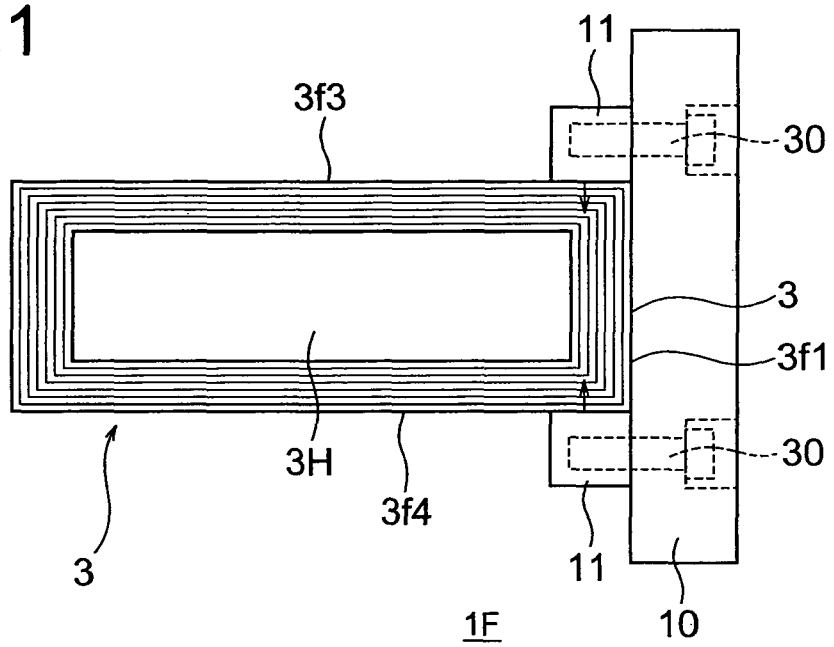
FIG. 21 is a perspective view showing a sectional structure of the movable member in the coreless linear motor illustrated in FIG. 19.

For fixing the coil assembly 3 to the holding member 10, as shown in FIG. 21, the outer circumferential surfaces 3f1 facing the holding member 10 are fixed to the holding member 10 by an electrically insulating binder 350. Then, in a state where the outer circumferential surfaces 3f3 and 3f4 facing the first and second groups of permanent magnets 60A and 60B of the coil assembly 3 are fastened by the fastening members 11, the fastening members 11 are fastened to the holding member 10 by bolts 30. Due to this, the coil assembly 3 is strongly fixed to the holding member 10.

Figure 22:
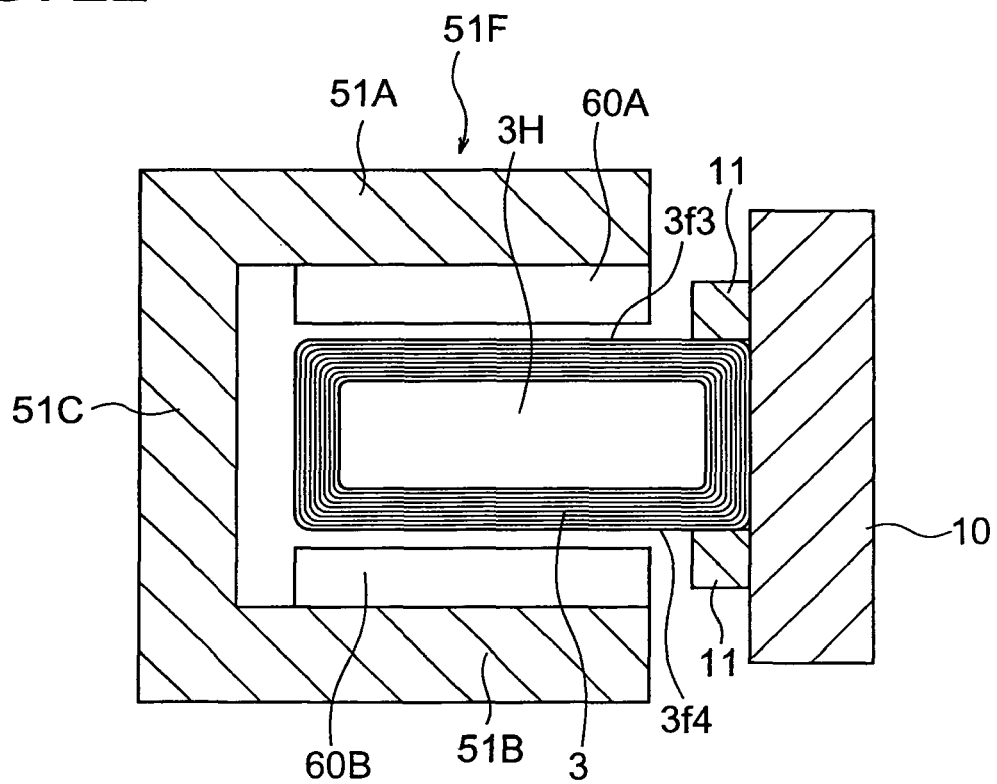
FIG. 22 is a perspective view showing the structure of a coreless linear motor of an eighth embodiment based on the present invention.

In the 3-phase coils 3A, 3B, and 3C, the contours of the cross-sections are square or rectangular, therefore, as shown in FIG. 22, the facing surfaces 60f of the facing first and second groups of permanent magnets 60A and 60B face the outer circumferential surfaces 3f3 and 3f4 of the coil assembly 3 across a predetermined space. The facing surfaces 60f and the outer circumferential surfaces 3f3 and 3f4 are substantially parallel. Between the facing first and second groups of permanent magnets 60A and 60B, only the coil assembly 3 connecting the coils 3A, 3B, and 3C is arranged. Accordingly, inside the hollow portion 3H of the coil assembly 3, neither the reinforcing member 20, nor magnetic member, nor conductive member of the first embodiment exist.

The operation of the coreless linear motor 1F of the seventh embodiment will be explained with reference to FIG. 23. In the same way as the coreless linear motor of the first embodiment, the lengths of adjacent pair of permanent magnets N and S and the lengths of the 3-phase coils 3A, 3B, and 3C in the direct-acting directions A1 and A2 substantially coincide.

Among the coils 3A, 3B, and 3C, almost no magnetic flux BF of the permanent magnets N and N, and S and S in the facing first and second groups of permanent magnets 60A and 60B extends from one of the facing permanent magnets N and N and S and S toward the other. It mainly extends from the adjacent permanent magnets N toward S since the polarities of the magnets are the same.

When the 3-phase AC currents of the U-phase, V-phase, and W-phase differing in phases by 120 degrees are applied to the 3-phase coils 3A, 3B, and 3C, the direction of the current flowing in the coils 3A, 3B, and 3C on the first facing yoke part 51A side and the direction of the current flowing in the coils 3A, 3B, and 3C on the second facing yoke part 51B side are reverse and the orientation of the magnetic flux BF passing through the coils 3A, 3B, and 3C on the first facing yoke part 51A side and the orientation of the magnetic flux BF passing through the coils 3A, 3B, and 3C on the second facing yoke part 51B side become reverse. For this reason, on the first facing yoke part 51A side and the second facing yoke part 51B side, thrusts having the same orientation are generated. Due to these thrusts, the movable member 2F is moved along the direct-acting directions A1 and A2.

Figure 23:
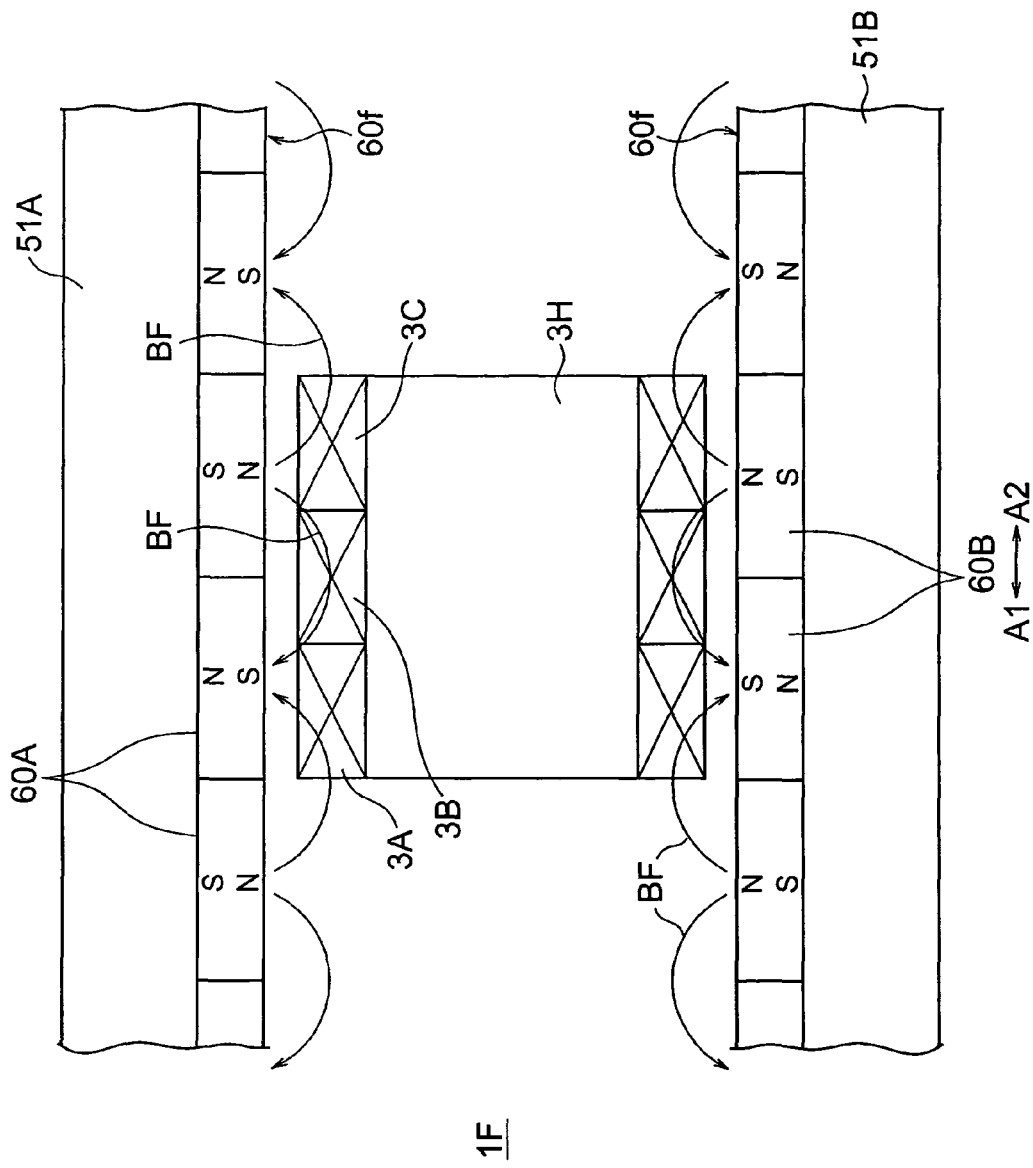
FIG. 23 is a diagram showing the operation of the coreless linear motors illustrated in FIG. 19 to FIG. 22.

As illustrated in FIG. 23, the magnetic fluxes BF of the permanent magnets N and S are mainly distributed near the surfaces 60f of the permanent magnets N and S and do not easily reach the internal portions of the coils 3A, 3B, and 3C. Accordingly, even when the conductive wires extend up to the cores of the coils 3A, 3B, and 3C, the magnetic fluxes of the permanent magnets N and S cannot be utilized. In the present embodiment, simultaneously with the raising of the efficiency of utilization of the magnetic fluxes of the permanent magnets N and S by defining the region where the magnetic flux does not reach in the coil assembly 3 as the hollow portion 3H, a reduction of weight of the coils 3A, 3B, and 3C is achieved. As a result, the mass of the movable member 2F can be reduced, and a high control response is achieved.

The coil assembly 3 has the hollow portion 3H, therefore the heat generated in the coils 3A, 3B, and 3C is easily radiated to the outside through this hollow portion 3H.

When air or another cooling medium flows through the hollow portion 3H, the cooling can be more efficiently carried out. As a result, the temperature rise of the coreless linear motor 1F can be suppressed, and the reduction of the positioning precision of the components of the coreless linear motor due to heat deformation can be prevented.

In the coil assembly 3, there is no conductor in the hollow portion 3H, therefore no induction current is generated due to the magnetic fields generated by the coils 3A, 3B, and 3C, and a force in the reverse direction to the thrust of the movable member 2F is not generated. As a result, no thrust fluctuation of the linear motor 1F due to the induction current occurs. In addition, no induction current is generated, therefore the reduction of the efficiency of the coreless linear motor can be prevented.

Also, excessive current loss can be avoided, so a reduction of the motor efficiency can be prevented.

Due to the above, according to the seventh embodiment, a coreless linear motor much suppressed in the fluctuation of thrust is obtained.

Eighth Embodiment

A coreless linear motor of an eighth embodiment based on the present invention will be explained with reference to FIG. 24 and FIG. 25.

Figure 24:
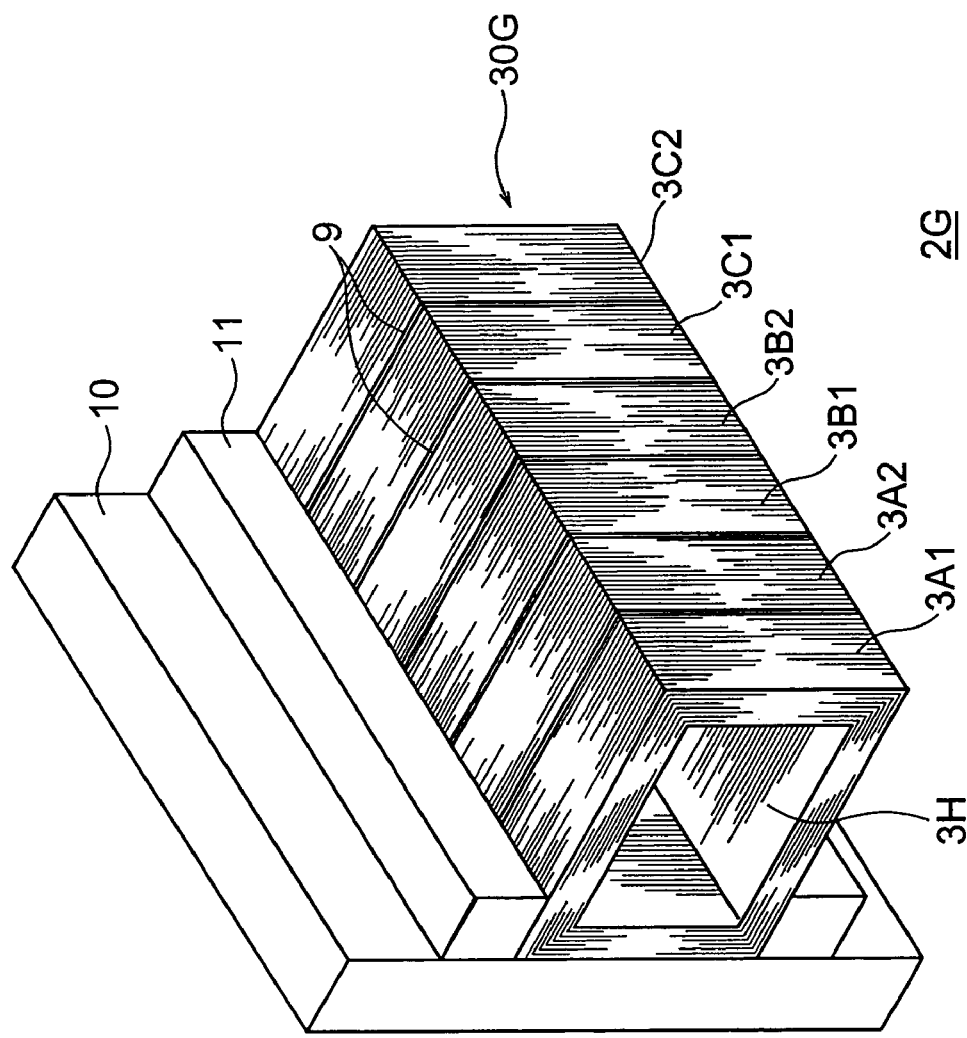
FIG. 24 is a perspective view showing the structure of a coreless linear motor of a ninth embodiment based on the present invention.
Figure 25:
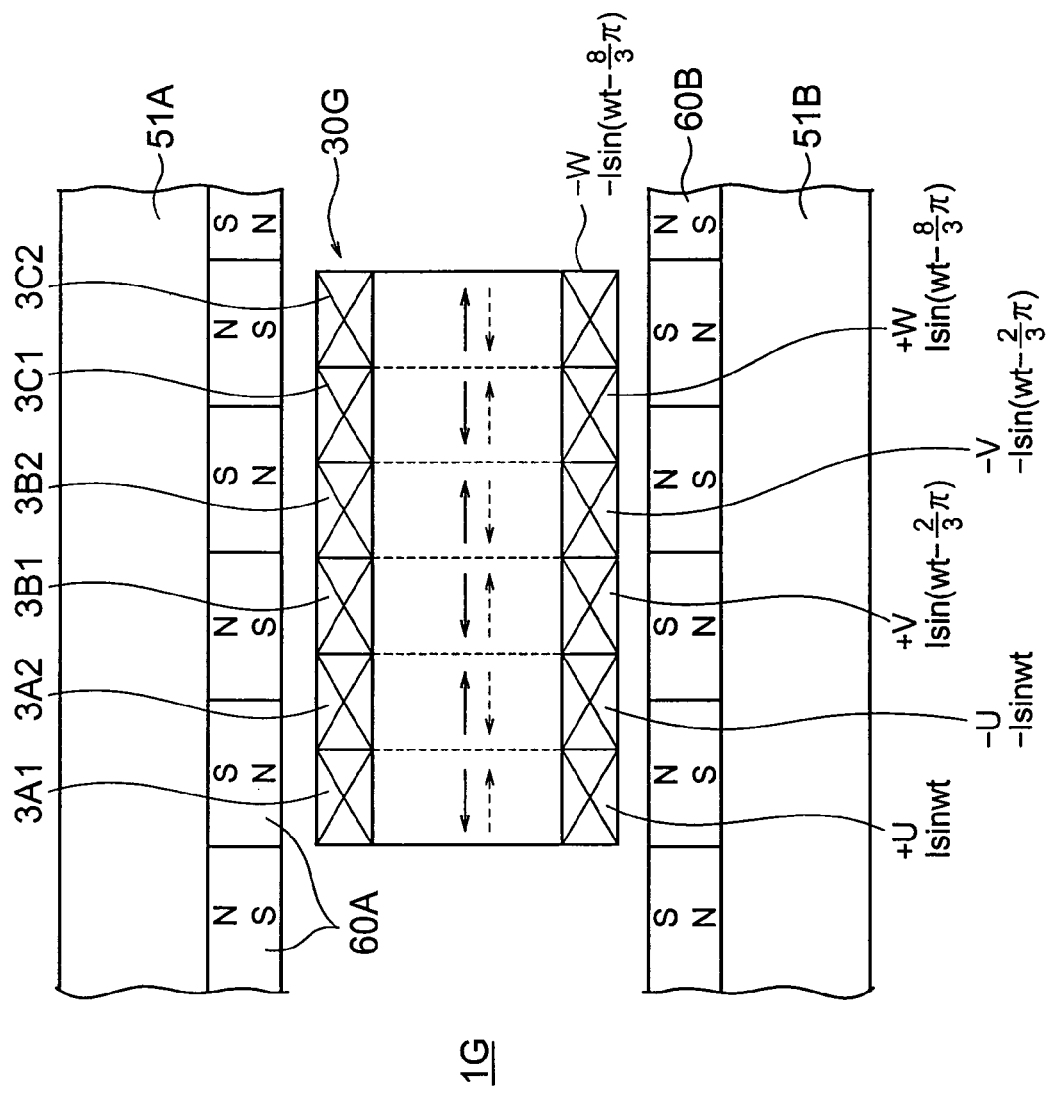
FIG. 25 is a diagram showing the operation of the coreless linear motor shown in FIG. 24.
Figure 26:
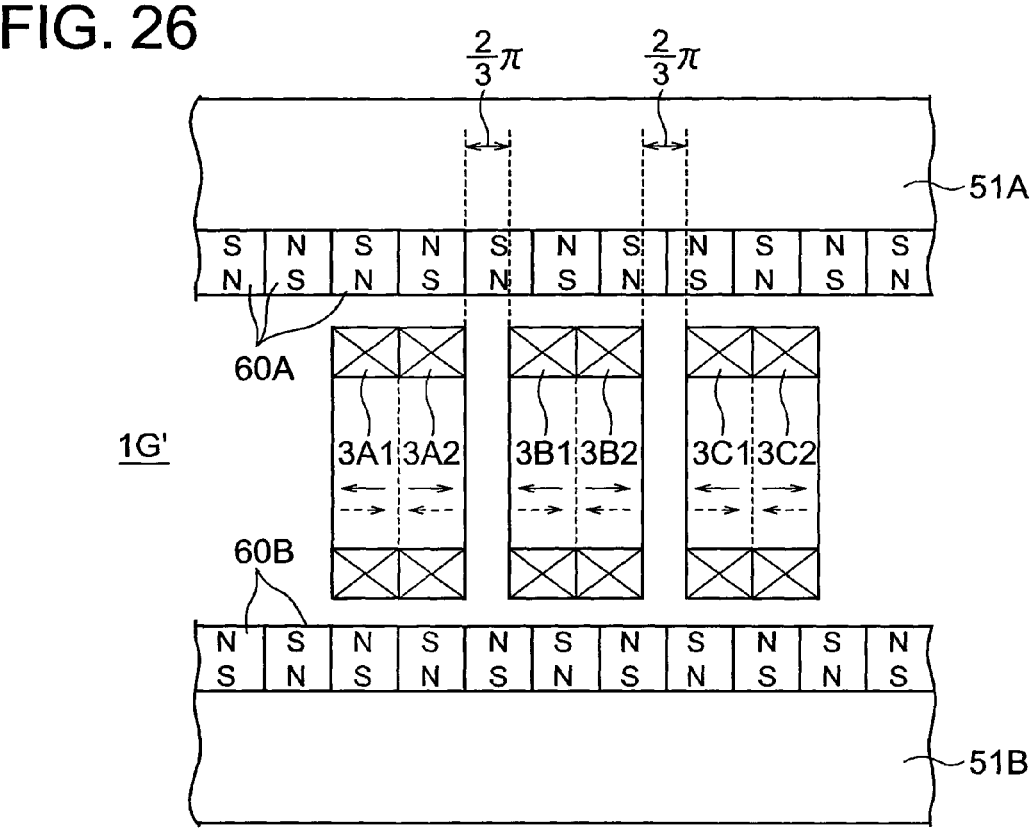
FIG. 26 is a diagram showing a modification of the ninth embodiment.

FIG. 24 is a perspective view showing the structure of a movable portion 2G of the coreless linear motor of the eighth embodiment of the present invention.

The basic configuration of the coreless linear motor of the eighth embodiment is the same as the coreless linear motor of the seventh embodiment explained with reference to FIG. 19 to FIG. 22. The same notations are used for the same components as those of the seventh embodiment.

The movable member 2G is provided with a coil assembly 30G constituted by a first group of 3-phase coils 3A1, 3B1, and 3C1 and a second group of 3-phase coils 3A2, 3B2, and 3C2 in the same way as the movable member 2 explained with reference to FIG. 6.

The operation of the coreless linear motor 1G of the eighth embodiment will be explained with reference to FIG. 25.

The lengths of the adjacent four permanent magnets N, S, N, and S and the lengths of the six coils in the direct-acting directions A1 and A2 are substantially the same.

The relationships and conditions of the 3-phase coils 3A1, 3B1, and 3C1 of the first group and the 3-phase coils 3A2, 3B2, and 3C2 of the second group are the same as the relationships and conditions of the 3-phase coils 3A1, 3B1, and 3C1 of the first group and the 3-phase coils 3A2, 3B2, and 3C2 of the second group in the movable member 2 explained with reference to FIG. 6. The 3-phase coils 3A2, 3B2, and 3C2 of the first group generates magnetic fields in reverse phases with respect to the 3-phase coils 3A1, 3B1, and 3C1 of the second group, that is, different in phases by 180 degrees. For example, when the winding orientations of the 3-phase coils 3A1, 3B1, and 3C1 of the first group and the 3-phase coils 3A2, 3B2, and 3C2 of the second group are the same, if the 3-phase AC currents of the U-phase, V-phase, and W-phase are applied to the 3-phase coils 3A1, 3B1, and 3C1 of the first group, and 3-phase AC currents of the -U-phase, -V-phase, and -W-phase different in phases by 180 degrees from the former 3-phase AC currents are applied to the 3-phase coils 3A2, 3B2, and 3C2 of the second group, magnetic fields in reverse orientations are generated in the coils 3A1 and 3A2 and the coils 3B1 and 3B2 of the first group and in the coils 3C1 and 3C2 of the second group. These are in the reverse phase relationships, therefore the magnetic fluxes of the magnetic fields are cancelled by each other. As a result, the magnetic fluxes leaked from the inside of the coils 3A1 and 3A2, coils 3B1 and 3B2, and coils 3C1 and 3C2 are suppressed, therefore the disturbance to the magnetic fields formed by the permanent magnets N and S can be reduced, and the magnetic saturation of the yoke 51 (first and second facing yoke parts 51A and 51B) due to the magnetic fluxes generated by coils can be prevented.

The method for imparting reverse phases to magnetic fields generated by the 3-phase coils 3A1, 3B1, and 3C1 of the first group and the 3-phase coils 3A2, 3B2, and 3C2 of the second group is the same as the case explained with reference to FIG. 6. For example, the winding directions of the 3-phase coils 3A1, 3B1, and 3C1 of the first group and the 3-phase coils 3A2, 3B2, and 3C2 of the second group may be made reverse and the 3-phase AC currents having the same phase may be applied or the method of connection of the coils may be changed.

Modification of Eighth Embodiment

A modification of the coreless linear motor of the eighth embodiment will be explained with reference to FIG. 8.

As explained with reference to FIG. 8, the lengths of the sets of the adjacent coils 3A1 and 3A2, coils 3B1 and 3b2, and coils 3C1 and 3C2 are made substantially the same as the lengths of the adjacent two permanent magnets N and S. The sets of the coils are arranged with phases different by exactly π/3 radians (60 degrees) or 2π/3 radians (120 degrees) based on the positions of the magnets. By generating the magnetic fields in the sets of coils in the same way as the linear motor of the seventh embodiment, the same mode of operation and effects as those by the seventh embodiment are obtained.

Ninth Embodiment

A coreless linear motor of a ninth embodiment based on the present invention will be explained with reference to FIG. 27.

Figure 27:
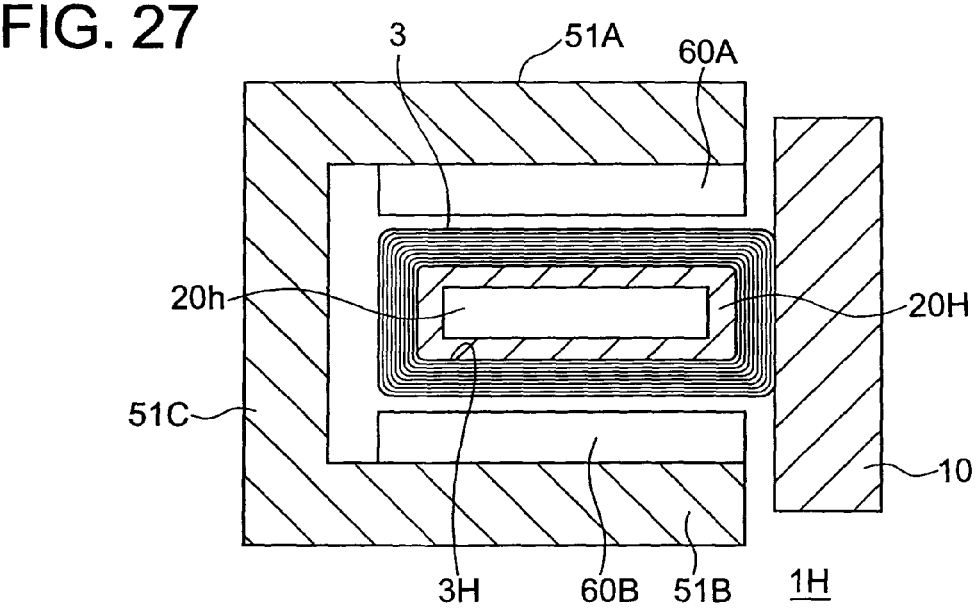
FIG. 27 is a perspective view showing the structure of a coreless linear motor of a 10th embodiment based on the present invention.

The basic configuration of a coreless linear motor 1H illustrated in FIG. 27 is the same as that of the coreless linear motor 1F illustrated in FIG. 21, but in the coreless linear motor 1H, a reinforcing member 20H is fit in the hollow portion 3H of the coil assembly 3.

The reinforcing member 20H has a sectional shape matching with the sectional shape of the hollow portion 3H of the coil assembly 3 and is fit in the inner circumference of the hollow portion 3H over the entire length of the hollow portion 3H. The reinforcing member 20H is connected with the coil assembly 3.

The reinforcing member 20H is provided so as to raise the rigidity of the coil assembly 3 in the same way as the reinforcing member 20 of the first embodiment. The reinforcing member 20H is provided with a hollow portion 20h. This hollow portion 20h is formed for reducing the weight of the reinforcing member 20H and raising the cooling effect of the coil assembly 3.

As the material for forming the reinforcing member 20H, in the same way as the reinforcing member 20 of the first embodiment, a non-magnetic electrical insulation material is used. As a preferred material of the reinforcing member 20H of the present embodiment, a material having a lighter weight than a metal and a high rigidity is preferred. A material such as FRP using glass epoxy resin, carbon fiber, or other reinforcing fibers is preferred.

The shape of the reinforcing member 20H was made cylindrical, but the shape is not limited to this. Various shapes can be employed. For example, the shape of the reinforcing member 20H may be made a flat plate. Further, a configuration may be employed not providing the reinforcing member along the entire circumference in the coil assembly 3, but providing flat plate reinforcing members on for example the facing pair of side surfaces. Further, it is also possible to use a solid member as the reinforcing member and make the entire hollow portion 3H the reinforcing member.

10th Embodiment

A coreless linear motor of a 10th embodiment based on the present invention will be explained with reference to FIG. 28 to FIG. 31.

Figure 28:
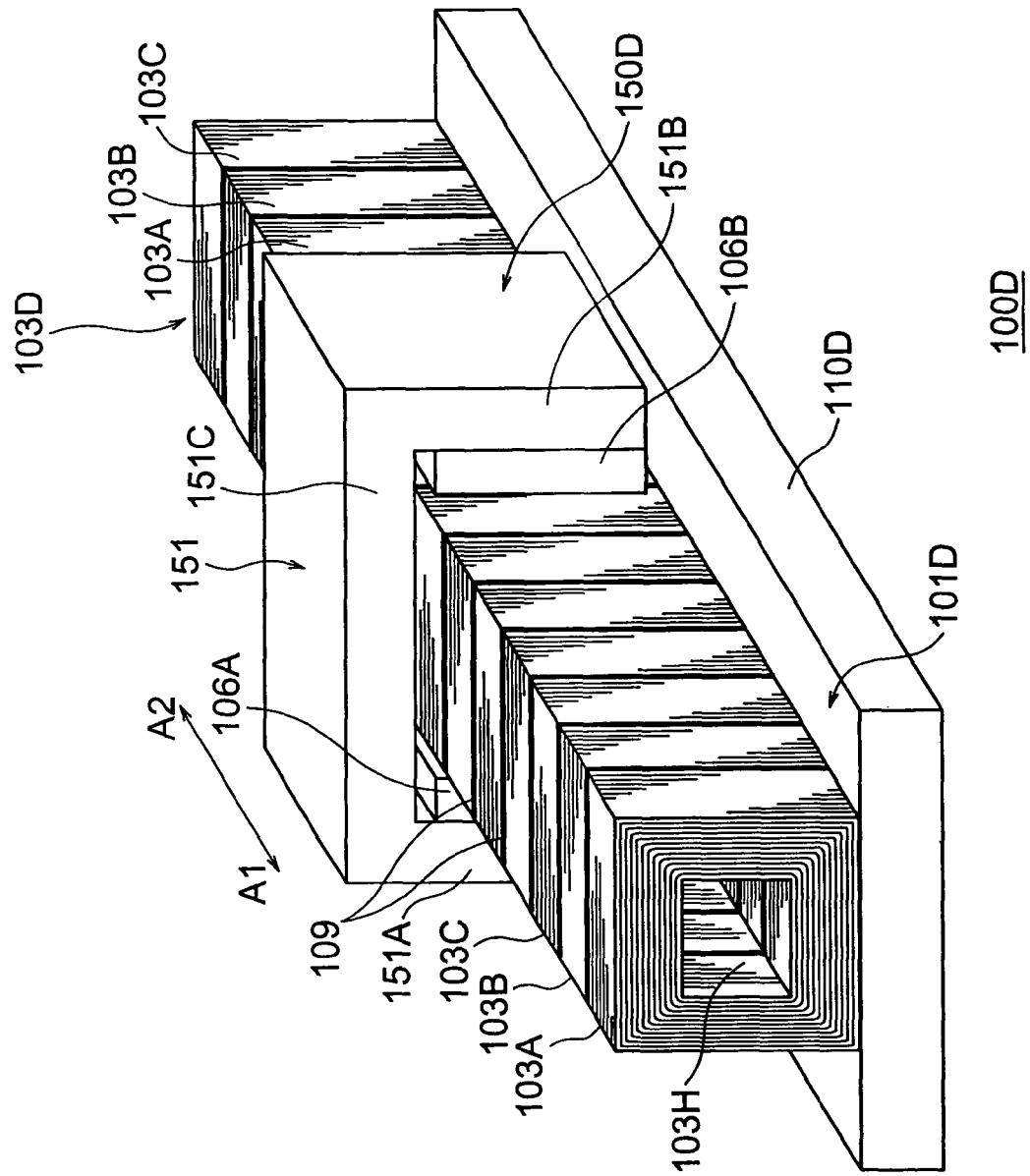
FIG. 28 is a perspective view showing the structure of a coreless linear motor of an 11th embodiment based on the present invention.

A coreless linear motor 100D illustrated in FIG. 28 has a movable member 150D and a fixed member 101D. In the present embodiment, the fixed member 101D functions as the armature.

The fixed member 101D has a coil assembly 103D and a holding member 110D.

The holding member 110D is shaped as a flat plate the same as that of the holding member 110 explained with reference to FIG. 12 and formed by a non-magnetic material, for example, a metal such as stainless steel or an aluminum alloy. The holding member 110D functions to hold the coil assembly 103 and is fixed to a not illustrated base or the like.

The coil assembly 103D is constituted by assembling a plurality of sets of 3-phase coils 103A, 103B, and 103C. The coils 103A, 103B, and 103C of each set are connected via the electrical insulation members 109. The coil assembly 103D is formed by the same method of formation of the coil assemblies 3 and 30 explained in the first and sixth embodiments. Note that it differs in the point that a large number of 3-phase coils 103A, 103B, and 103C are connected and the total length is long.

Figure 29:
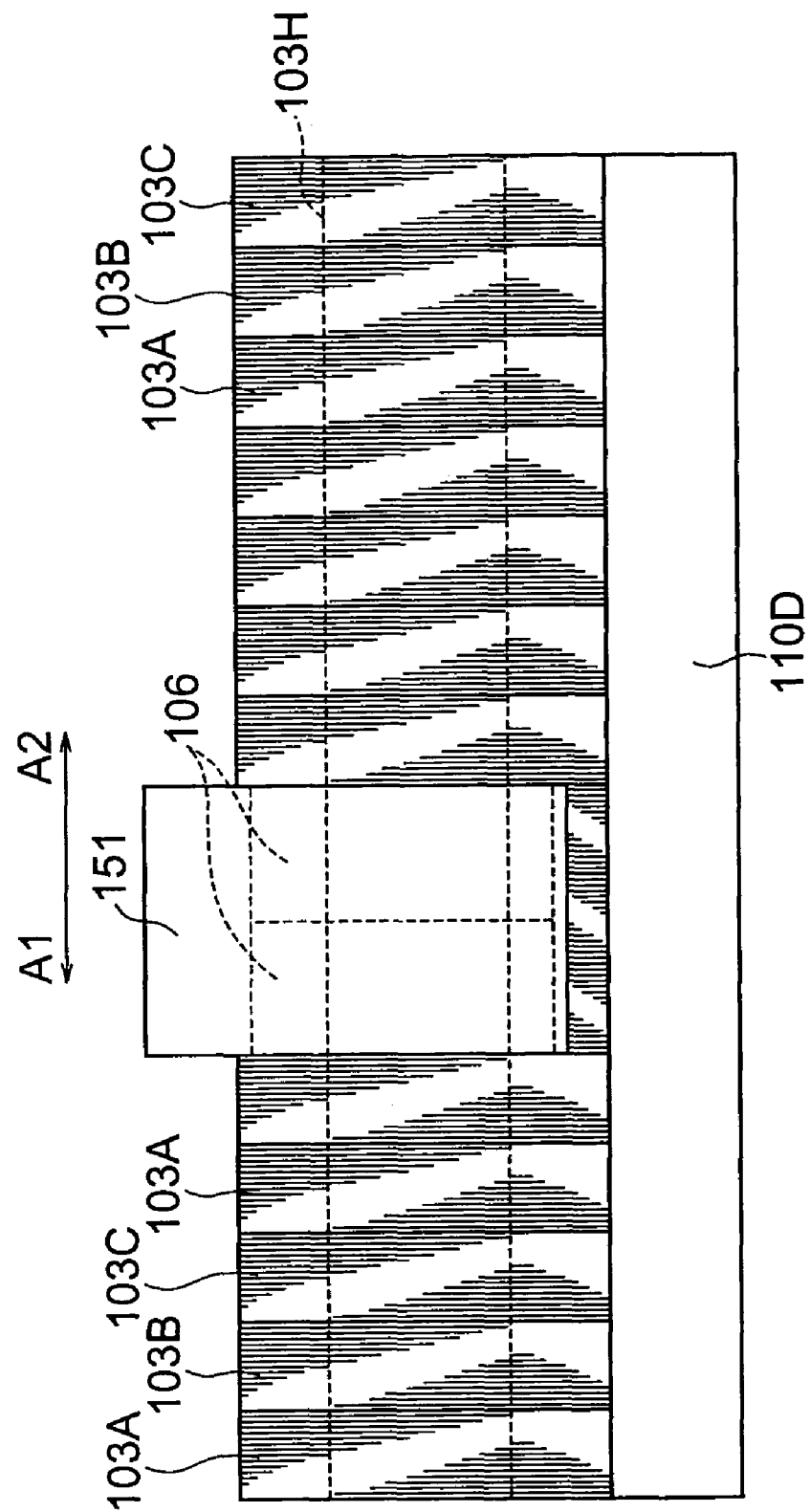
FIG. 29 is a side sectional view of the coreless linear motor illustrated in FIG. 28.

As shown in FIG. 29, the holding member 110D holds the facing outer circumferential surfaces of the coil assembly 103D over the entire surface. For this reason, the rigidity of the fixed member 101D having a relatively long total length rapidly rises.

The hollow portion 103H of the coil assembly 3D runs along the direct-acting directions A1 and A2.

The movable member 150D has a yoke 151 and first and second groups of permanent magnets 106A and 106B arranged on facing surfaces of the first and second facing yoke parts 151A and 151B of the yoke 151. The movable member 150D is movably supported in the direct-acting directions A1 and A2 by a not illustrated guide mechanism.

The configuration of the yoke 151 shown in FIG. 29 is given the same configuration as that of the yoke 151 explained with reference to FIG. 13 and is produced by the same material. Note that the yoke 151 illustrated in FIG. 13 is fixed and does not move, but the yoke 151 shown in FIG. 29 moves together with the first and second groups of permanent magnets 106A and 106B.

The yoke 151 of the present embodiment can be formed by iron or another magnetic material, but from the viewpoint of the reduction of weight of the movable member 150D, aluminum alloy or another high specific strength, light weight material can be used. Alternatively, a magnetic material may be used for the first and second facing yoke parts 151A and 151B, and aluminum, an aluminum alloy, or other non-magnetic material may be used for the connection yoke part 151C.

The conditions etc. of the first and second groups of permanent magnets 106A and 106B are the same as those explained above.

Figure 30:
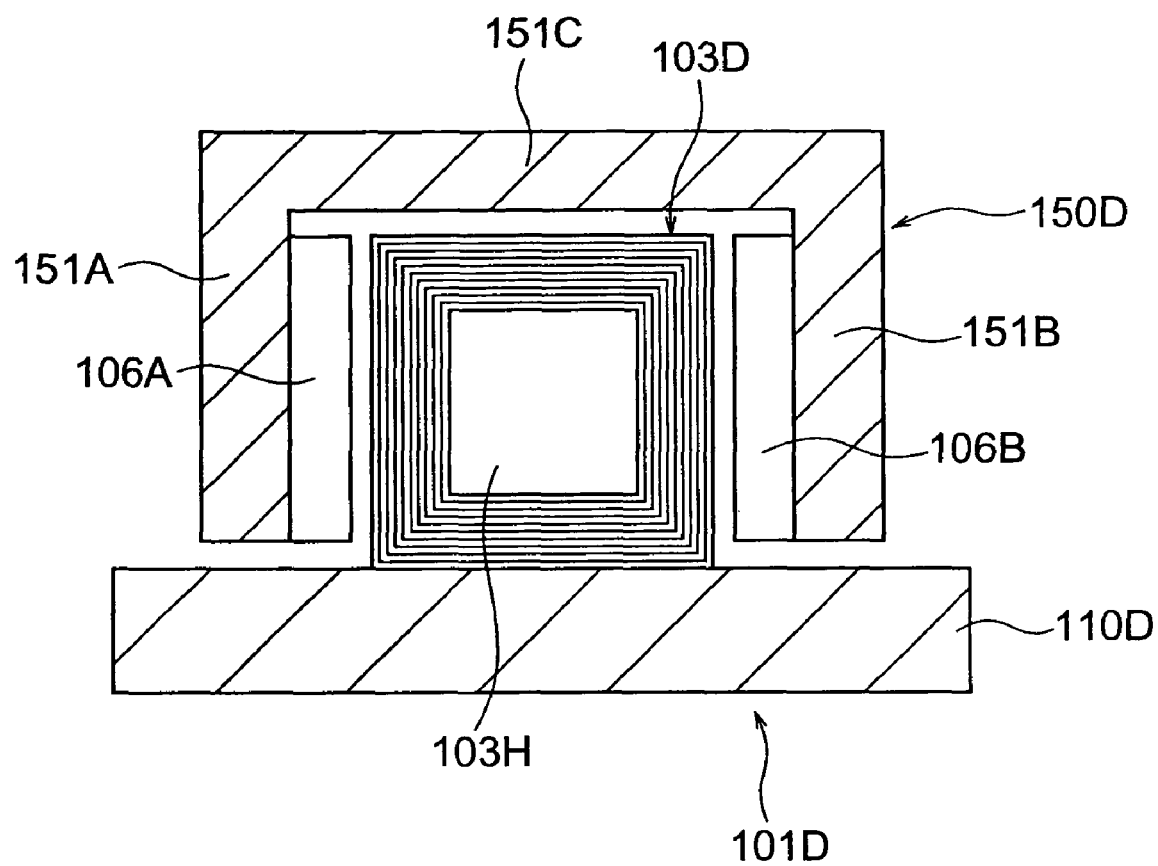
FIG. 30 is a sectional view of the coreless linear motor illustrated in FIG. 28.
Figure 31:
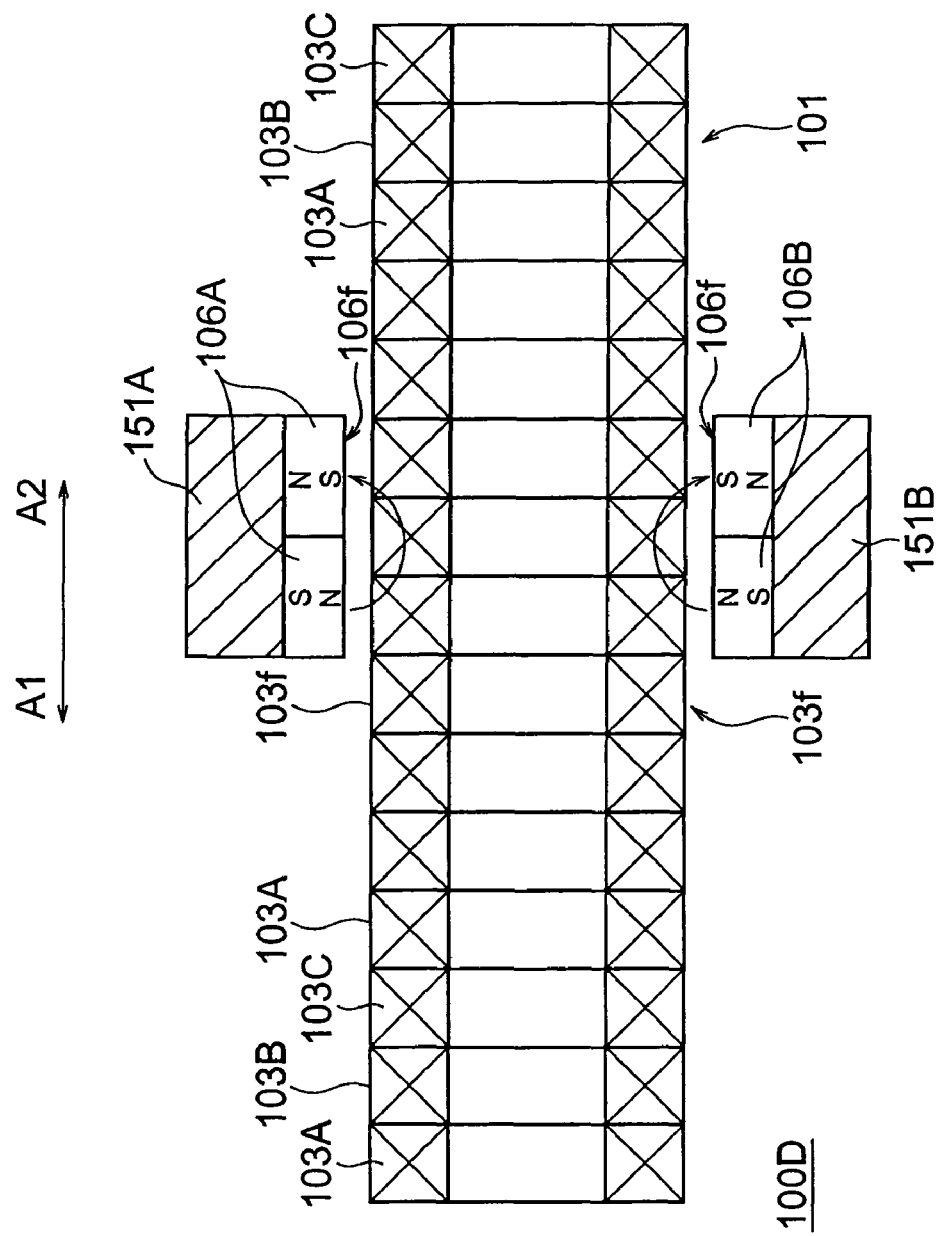
FIG. 31 is a diagram for explaining the operation of the coreless linear motor illustrated in FIG. 28.

In the 3-phase coils 103A, 103B, and 103C of each set, the cross-sectional contour becomes a rectangle, therefore, as shown in FIG. 30 and FIG. 31, facing surfaces 106f of the facing first and second groups of permanent magnets 106A and 106B face the outer circumferential surfaces 103f of the coil assembly 103 with a predetermined space, and the facing surfaces 106f and the outer circumferential surfaces 103f are arranged substantially parallel.

The operation of the coreless linear motor 100H will be explained with reference to FIG. 31.

The operation of the coreless linear motor 100H is basically the same as the operation of the coreless linear motor 100 explained with reference to FIG. 14 except that the fixed member and the movable member are reverse. Below, the operation of the coreless linear motor 100H will be simply explained.

The lengths of the adjacent two permanent magnets N and S, and dimensions of the 3-phase coils 103A, 103B, and 103C in the direct-acting directions A1 and A2 substantially coincide.

Almost no magnetic flux of the facing permanent magnets N and N, and permanent magnets S and S extends from one to the other. The flux mainly extends to adjacent permanent magnets N and S. Accordingly, the magnetic flux BF from the permanent magnet N to S is mainly distributed near surfaces of the adjacent permanent magnets N and S and does not easily reach the internal portions of the coils 103A, 103B, and 103C.

When 3-phase AC currents of the U-phase, V-phase, and W-phase different in phases by 120 degrees are applied to the 3-phase coils 103A, 103B, and 103C, thrusts having the same orientations are generated on the first facing yoke part 151A side and the second facing yoke part 151B side. Due to this thrust, the yoke 151 and the movable member 150D including the first and second groups of permanent magnets 106A and 106B move along the direct-acting directions A1 and A2.

Figure 32:
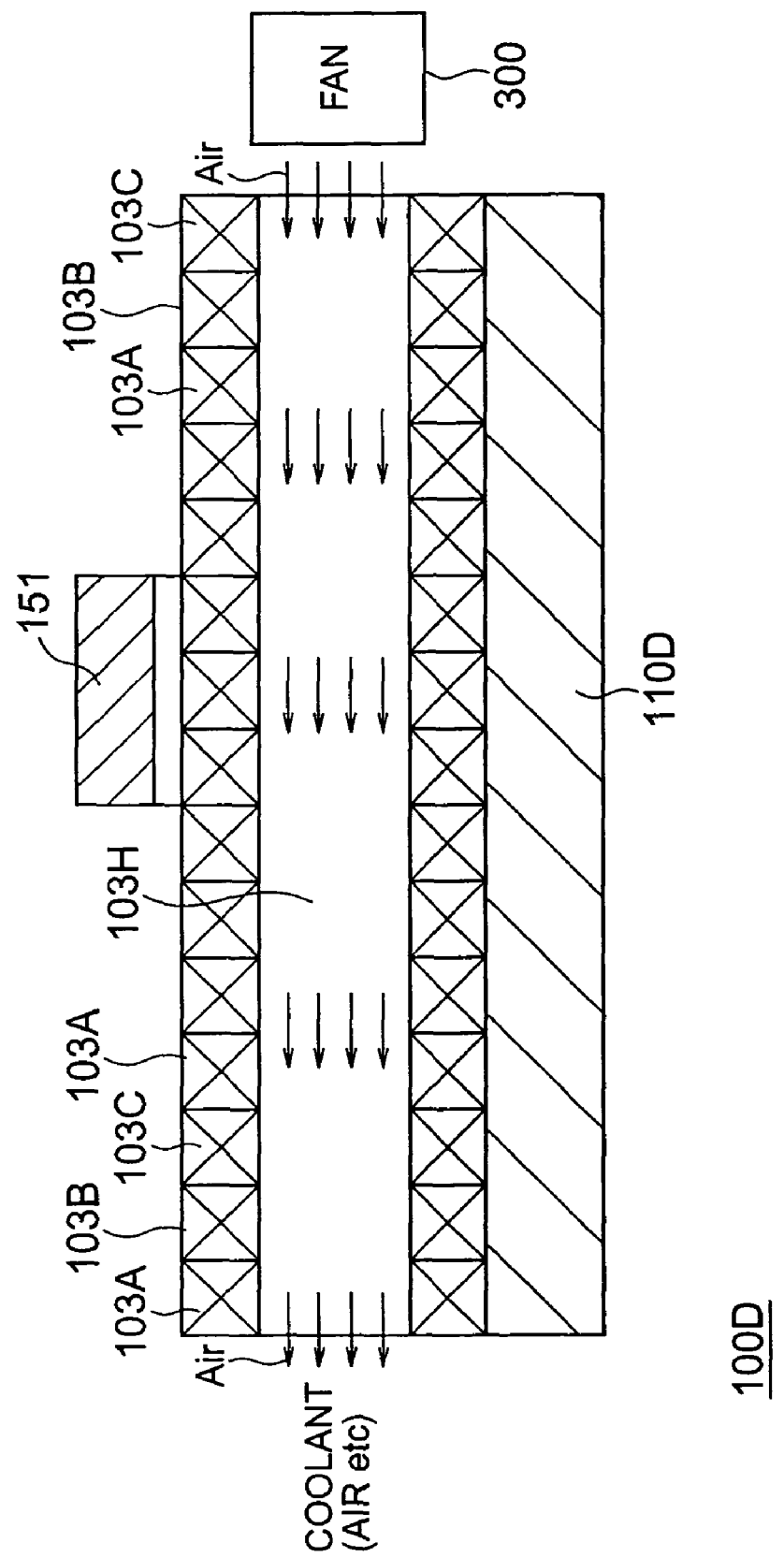
FIG. 32 is a diagram for explaining an example of the cooling method of the coreless linear motor illustrated in FIG. 31.
Figure 33:
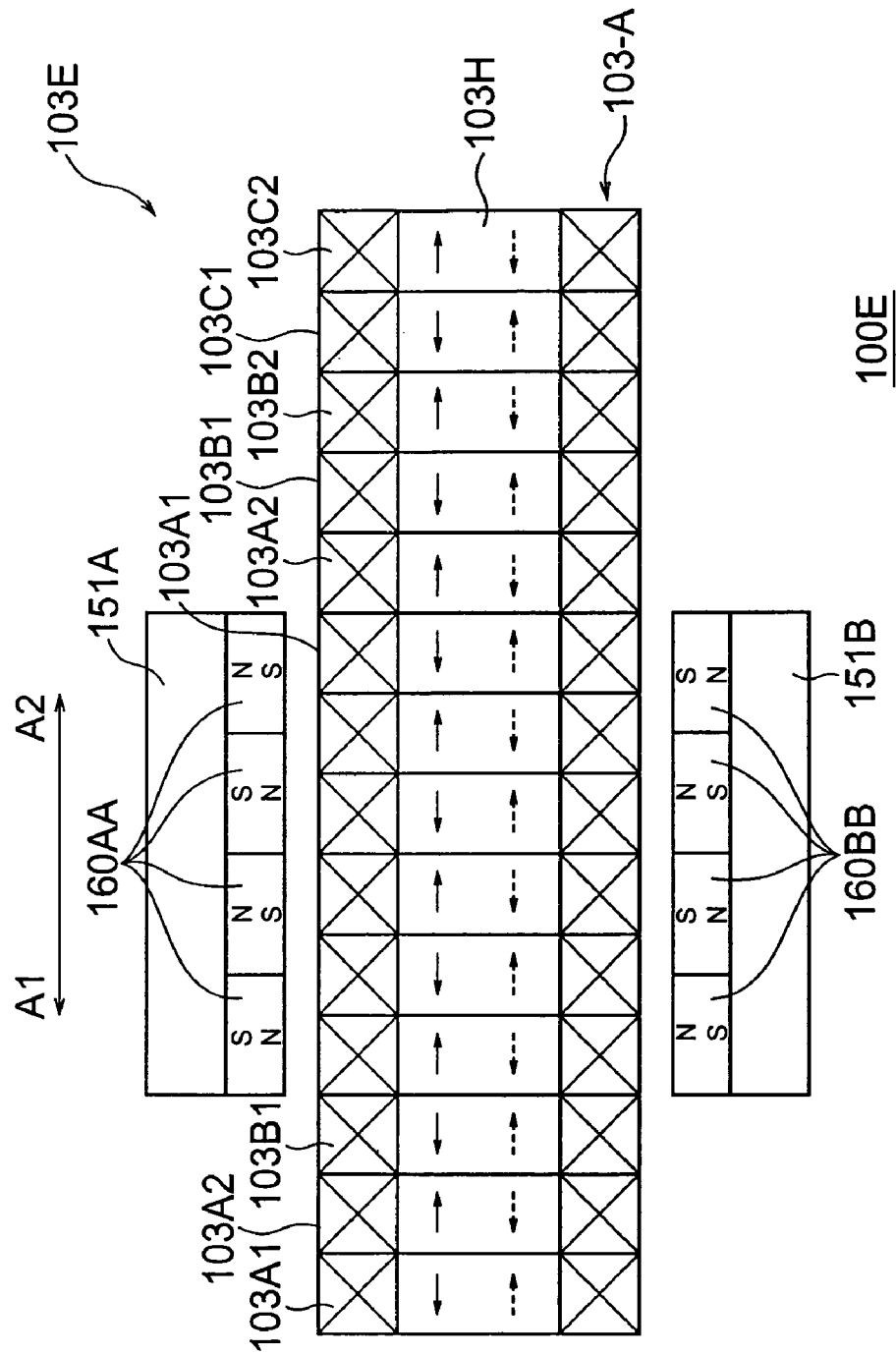
FIG. 33 is a perspective view showing the structure of a coreless linear motor of a 12th embodiment based on the present invention.

An example of the cooling method of the coreless linear motor 100D illustrated in FIG. 31 will be explained with reference to FIG. 32.

Air is supplied from one end of the hollow portion 103H of the coil assembly 103D by using a fan 300. The air supplied from one end of the hollow portion 103H passes through the hollow portion H, efficiently absorbs the heat, and is discharged from the other end of the hollow portion 103H.

In the present embodiment, the coil assembly 103D is fixed, therefore forcible cooling can be easily carried out by constantly supplying a cooling medium such as air or water to the hollow portion 103H, and the temperature of the coreless linear motor 100D can be easily controlled.

11th Embodiment

A coreless linear motor of an 11th embodiment based on the present invention will be explained with reference to FIG. 32.

In the coreless linear motor 100E, the fixed member is the armature, and the movable member has a yoke 151 and first and second groups of permanent magnets 106A and 106B arranged in the first and second facing yoke parts 151A and 151B.

The configuration of the coreless linear motor 100E of the 11th embodiment is the same as that of the coreless linear motor 100A explained with reference to FIG. 16 except that the relationships of the fixed member and the movable member are reverse.

The 3-phase coils 103A2, 103B2, and 103C2 generate magnetic fields different in phases by 180 degrees with respect to the 3-phase coils 103A1, 103B1, and 103C1.

In the coreless linear motor 100E, when 3-phase AC currents of the U-phase, V-phase, and W-phase are applied to the 3-phase coils 103A1, 103B1, and 103C1, and the 3-phase AC currents of the -U-phase, -V-phase, and -W-phase having different phases by 180 degrees from the former 3-phase AC currents are applied to the 3-phase coils 103A2, 103B2, and 103C2, magnetic fields in reverse orientations are generated in the coils 103A1 and 103A2, in the coils 103B1 and 103B2, and in the coils 103C1 and 103C2, and the movable member having the yoke 151 and the first and second groups of permanent magnets 106AA and 106BB move in the direct-acting directions A1 and A2 relative to the coil assembly 103E.

12th Embodiment

A coreless linear motor of a 12th embodiment based on the present invention will be explained with reference to FIG. 34 and FIG. 35.

Figure 34:
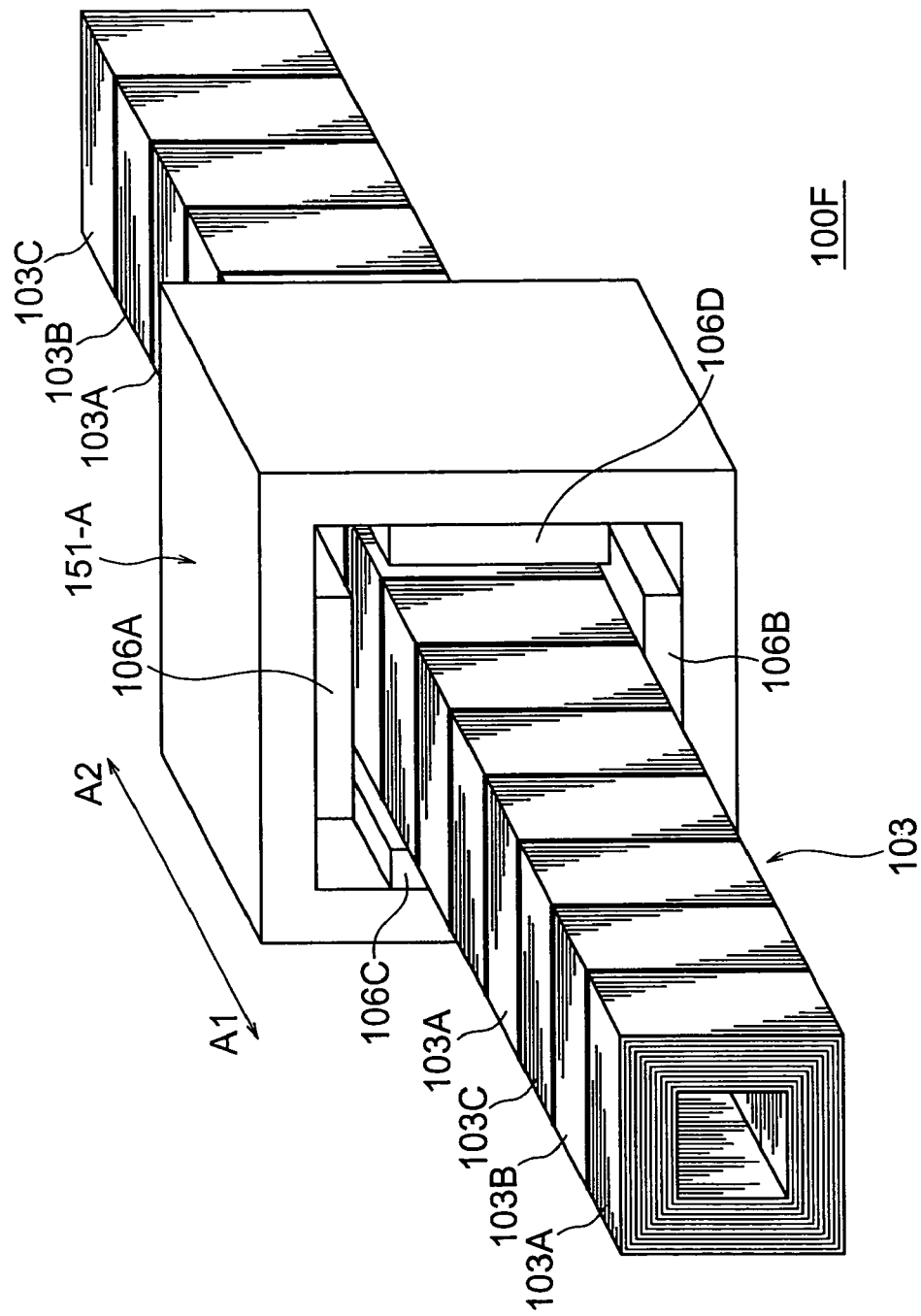
FIG. 34 is a diagram showing the configuration of the coreless linear motor of the 12th embodiment based on the present invention.
Figure 35:
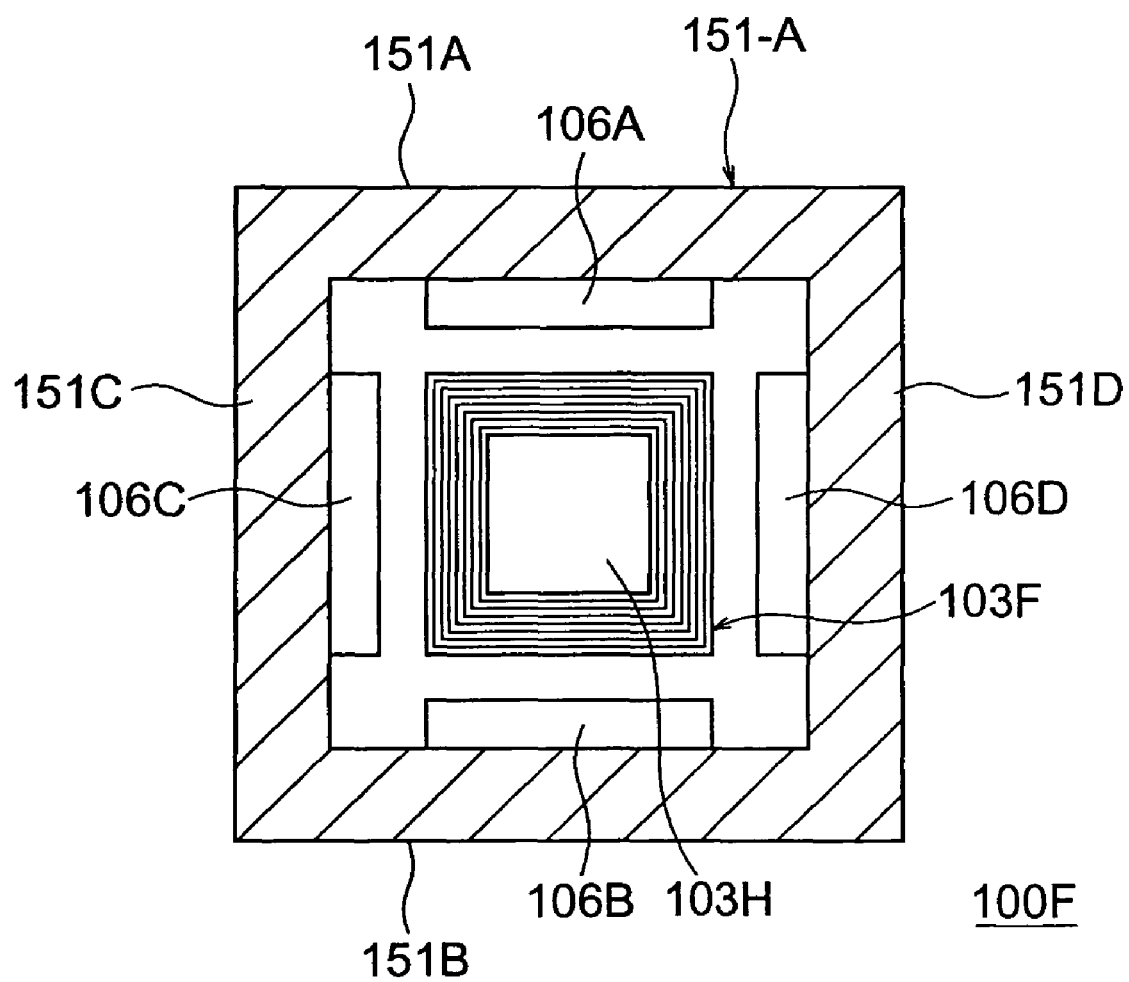
FIG. 35 is a sectional view showing the structure of the movement and fixed members of the coreless linear motor shown in FIG. 34.

FIG. 34 is a diagram showing the configuration of the coreless linear motor of the 12th embodiment based on the present invention, and FIG. 35 is a sectional view showing the structure of the movable member and the fixed member of the coreless linear motor shown in FIG. 34.

In the coreless linear motor 100F of the present embodiment, the armature is the fixed member, and the movable member is provided with groups of permanent magnets 106A to 106D of four groups. Relationships of the fixed member and the movable member are reverse, but the structure of the yoke 151-A and the provision of the four groups of permanent magnets 106A to 106D in the yoke 151-A are the same as explained with reference to FIG. 19.

By disposing four groups of permanent magnets 106A to 106D at the yoke 151-A, the efficiency of utilization of the permanent magnets utilized by the coils rises and the thrust etc. can be improved.

In the above embodiment, the sectional shape of the coils was made rectangular or square, and the groups of permanent magnets 60A and 60B or the first and second groups of permanent magnets 106A and 106B etc. were made flat plates in shape, but the present invention is not limited to this. For example, as the sectional shape of the coils, other shapes such as square, circular, and oval shapes may be employed. The permanent magnets can be bent in accordance with these shapes.

The above reinforcing member can also be applied to the coil of a coreless linear motor of a type in which a center yoke is inserted into the coil.

The effects of the coreless linear motor of the present invention will be explained below.

The coil used for the armature is formed by winding the conductive wire in the cylindrical state, therefore the sectional secondary moment of the coil can be largely obtained, and the rigidity of the coil, particularly the bending and shearing rigidities, rises. Further, by aligning and winding the conductive wires in multiple layers to a cylindrical state, fastening them by a binder, and connecting the end surfaces to each other via electrical insulation members, the rigidity of the coils per se rapidly rises. In particular, when using the coil assemblies 3 and 30 etc. as the fixing members of the coreless linear motors, the reinforcing members 20 and 120 need not be used. By forming the coils as explained above and only fixing them to the holding member 110 by using the fastening members 11, a sufficient rigidity can be obtained.

When arranging magnets for forming the magnetic circuits so as to face each other at positions facing the outer circumferential surfaces of the 3-phase coils formed in this way and arranging them so that magnetic poles having the same polarity face each other, the orientations of the magnetic fluxes of the facing magnets are reverse, therefore the magnetic fluxes reach the coils located at the positions near the magnets, but the magnetic density becomes very small inside the 3-phase coils.

The orientation of the force generated between the magnetic flux of one of facing magnets and the coil and the orientation of the force generated between the magnetic flux of the other magnet and the coil become the same. This becomes the thrust of the movable member.

The non-magnetic conductive reinforcing member supports the inner circumferences of the 3-phase coils and further reinforces the coils improved in rigidity. This reinforcing member has conductivity. Magnetic flux generated by the 3-phase coils passes through it. Therefore, an induction current flows. However, the member is inside the coils where the magnetic flux from the magnets does not reach, therefore almost no force in the reverse direction to the thrust is generated. The reinforcing member functions also as a heat radiating means for radiating the heat of the coils. The reinforcing member is desirably reduced in weight. Therefore, aluminum alloy etc. is used for the reinforcing member.

When 3-phase coils of the second set having reverse phase relationships with respect to the 3-phase coils of the first set are arranged adjacent to the phase coils, magnetic fluxes in reverse orientations are generated inside the mutually adjacent coils, they are cancelled by each other, the magnetic flux passing through the reinforcing member is much reduced, and almost no induction current begins to flow in the reinforcing member. As a result, even when the magnetic flux from the magnets reaches the reinforcing member, the generation of a force in the reverse direction to the thrust can be greatly suppressed. Further, the excessive current loss can be avoided, and the reduction of the efficiency of the motor can be prevented.

The above fixed member and movable member can be reversed. Where the coil assemblies 3, 103 etc. are used as the fixed members, it becomes easy to provide the cooling medium to the hollow portions etc. of the coil assemblies 3 and 103, and the effect of the heat radiation measures of the coreless linear motor rises.

The invention claimed is:

1. A coreless linear motor comprising:
   a fixed member functioning as a stator; and
   a movable member functioning as an armature;
   the fixed member having a yoke and first and second groups of permanent magnets fixed to the yoke;
   the movable member having a coil assembly having an inner shape of a rectangle and a reinforcing member, the reinforcing member having an outer shape of a rectangle on which the coil assembly is fittingly mounted, the reinforcing member extending in a longitudinal direction of the linear motor, being not positioned in the magnetic field between the coil assembly and the first and second groups of permanent magnets, being made of a nonmagnetic, electrically and thermally conductive material, conducting the heat generated in the coil assembly to an outside, and being formed without any hollow or cavity for increasing the rigidity of coil assembly;
   the yoke having first and second facing yoke parts facing each other across a first distance and formed by magnetic material and a connection yoke part connecting first ends of the first and second facing yoke parts to define a space through which the movable member is movable, the first, second and connection yokes being formed by magnetic material;
   the first and second groups of permanent magnets being arranged so as to face the facing surfaces of the first and second facing yoke parts, each of the first and second groups of permanent magnets having different magnetic poles alternately arranged, along the longitudinal direction of the yoke, and the facing magnetic poles of the permanent magnets along the longitudinal direction of the yoke being the same;
   the coil assembly having at least three coils, continuously arranged, functioning as three phase coils, and wound in a same direction having a hollow shape and rectangular or square outer shape, the nonmagnetic reinforcing member being fitted into the hollow shape, and arranged movably relative to the first and second groups of permanent magnets along the longitudinal direction of the yoke;
   each coil being wound in a cylindrical form by a conductive metal wire;
   the at least three coils being arranged in multiple layers, then fastened by a binder, the end surfaces of adjacent coils connected with each other via an electrical insulation member;
   the coil assembly and reinforcing member moving in the space between the facing first and second groups of permanent magnets along the longitudinal directions of the yoke.

2. A coreless linear motor as set forth in claim 1 wherein, in the cross-sectional shape of each coil, a length facing the first and second groups of permanent magnets is longer than a length perpendicular to the first and second groups of permanent magnets.

3. A coreless linear motor as set forth in claim 1, wherein in the cross-sectional shape of the reinforcing member, a length of a side facing the first and second groups of permanent magnets is longer than a length of a side perpendicular to the first and second groups of permanent magnets.

4. A coreless linear motor as set forth in claim 3, wherein the reinforcing member is produced by aluminum or an aluminum alloy.

5. A coreless linear motor as set forth in claim 3, wherein the movable member is further provided with a holding member and spacers, and
   the two ends of the reinforcing member inserted into the coil assembly are held by the holding member via the spacers.

6. A coreless linear motor as set forth in claim 5, wherein the reinforcing member and the spacers are formed by materials having a heat conductivity.

7. A coreless linear motor as set forth in claim 6, wherein the reinforcing member and the spacers are formed by aluminum or an aluminum alloy.

8. A coreless linear motor as set forth in claim 3, wherein the reinforcing member is arranged spaced from the surfaces of the first and second groups of permanent magnets by a distance whereby the density of the magnetic flux incident upon the surface of the reinforcing member becomes ½ or less of the magnetic flux density of the magnets at the center of the surfaces of the facing first and second groups of permanent magnets.

9. A coreless linear motor as set forth in claim 1, wherein the length of the three coils in the longitudinal direction of the yoke and the length of two adjoining magnets of the first group of permanent magnets are equal.

10. A coreless linear motor as set forth in claim 1, wherein the coil assembly forming an armature has a first set of 3-phase coils and a second set of 3-phase coils generating magnetic fields of opposite phases, and the different phase coils corresponding to the first and second sets of 3-phase coils are arranged adjoining each other.

11. A coreless linear motor as set forth in claim 1, wherein the yoke has a square or rectangular cross-section and has first and second facing yoke parts formed by magnetic materials and third and third facing yoke parts perpendicularly intersecting the first and second facing yoke parts and formed by magnetic materials;

the groups of permanent magnets have first and second groups of permanent magnets arranged facing surfaces of the first and second facing yoke parts and third and fourth groups of permanent magnets arranged facing surfaces of the third and fourth facing yoke parts;

each of the first and second groups of permanent magnets has a plurality of magnets along a longitudinal direction of the yoke, in the plurality of magnets of the first and second groups of permanent magnets, the poles of the magnets facing each other along the longitudinal direction of the yoke being alternately different, and the poles of the permanent magnets along the longitudinal direction of the yoke being the same; and each of the third and fourth groups of permanent magnets has a plurality of magnets along a longitudinal direction of the yoke, in the plurality of magnets of the third and fourth groups of permanent magnets, the poles of the magnets facing each other along the longitudinal direction of the yoke being alternately different, and the poles of the permanent magnets along the longitudinal direction of the yoke being the same.

12. A coreless linear motor as set forth in claim 1, wherein the at least three coils have square cross-sections.

* * * * *